United States Patent
Lind et al.

(10) Patent No.: US 12,531,739 B2
(45) Date of Patent: Jan. 20, 2026

(54) TECHNIQUES FOR PHISHING-RESISTANT ENROLLMENT AND ON-DEVICE AUTHENTICATION

(71) Applicant: OKTA, INC., San Francisco, CA (US)

(72) Inventors: Stephen Woodward Lind, El Cerrito, CA (US); Helen Hoilam Chen, San Mateo, CA (US); Sathishkumar Kaliavaradhan, Pompano Beach, FL (US); Bidan Sinha, Milpitas, CA (US); Kenton Quinh Smith, Las Vegas, NV (US); Chandrashekhar Shirashyad, Fremont, CA (US); Michael Biviano, San Francisco, CA (US); Yannong Li, San Francisco, CA (US); Umang Shah, Fremont, CA (US)

( * ) Notice: Subject to any disclaimer, the term of this patent is extended or adjusted under 35 U.S.C. 154(b) by 230 days.

(21) Appl. No.: 18/405,950

(22) Filed: Jan. 5, 2024

(65) Prior Publication Data
US 2025/0226985 A1    Jul. 10, 2025

(51) Int. Cl.
*H04L 9/32* (2006.01)
*H04L 9/08* (2006.01)

(52) U.S. Cl.
CPC .......... *H04L 9/3213* (2013.01); *H04L 9/0825* (2013.01); *H04L 9/3228* (2013.01); *H04L 9/3263* (2013.01)

(58) Field of Classification Search
CPC ... H04L 9/3213; H04L 9/0825; H04L 9/3228; H04L 9/3263; H04L 2463/082; H04L 63/08; H04L 63/0838; H04L 63/0846
See application file for complete search history.

(56) References Cited

U.S. PATENT DOCUMENTS

| | | | | |
|---|---|---|---|---|
| 10,255,419 | B1* | 4/2019 | Kragh | H04L 9/321 |
| 10,812,473 | B2* | 10/2020 | Ramesh Kumar | H04L 63/0807 |
| 2016/0182473 | A1* | 6/2016 | Cignetti | G06F 21/44 |
| | | | | 713/171 |
| 2016/0197914 | A1* | 7/2016 | Oberheide | H04L 63/0853 |
| | | | | 713/183 |
| 2018/0083941 | A1* | 3/2018 | Thakkar | H04L 63/08 |
| 2018/0191501 | A1* | 7/2018 | Lindemann | H04L 9/0833 |
| 2019/0228178 | A1* | 7/2019 | Sharma | H04L 63/0853 |
| 2020/0007530 | A1* | 1/2020 | Mohamad Abdul | |
| | | | | H04W 12/084 |
| 2020/0099693 | A1* | 3/2020 | Khosravi | H04W 4/80 |
| 2020/0351267 | A1* | 11/2020 | Rolfe | H04L 63/06 |
| 2021/0081947 | A1* | 3/2021 | Hockey | G06F 21/62 |
| 2021/0144015 | A1* | 5/2021 | Rossi | H04L 9/3263 |
| 2024/0112177 | A1* | 4/2024 | Maier | G06Q 40/00 |

* cited by examiner

*Primary Examiner* — Techane Gergiso
(74) *Attorney, Agent, or Firm* — Holland & Hart LLP

(57) ABSTRACT

Methods, systems, and devices for phishing-resistant authenticator enrollment are described. An authentication service may encrypt a token that is usable for an initial enrollment of a user in an authenticator application. The authentication service may transmit a first payload to the user. The first payload includes at least the encrypted token. An authenticator application may receive, from the user, a request to initiate the initial enrollment of the user on a device. The request may include the encrypted token. The authentication service may enroll the user in the authenticator application on the device based on decryption of the encrypted token using an encryption key on a near-field communication (NFC) device.

20 Claims, 10 Drawing Sheets

TECHNIQUES FOR PHISHING-RESISTANT ENROLLMENT AND ON-DEVICE AUTHENTICATION

FIELD OF TECHNOLOGY

The present disclosure relates generally to identity management, and more specifically to techniques for phishing-resistant enrollment and on-device authentication.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials. To grant a user access to a resource, the identity management system may request that the identity of the user be authenticated via a phishing-resistant authenticator.

SUMMARY

A method for authenticator enrollment in a multi-tenant system by an apparatus is described. The method may include encrypting a token that is usable for an initial enrollment of a user in an authenticator application associated with the multi-tenant system, where the user is associated with a tenant of the multi-tenant system, transmitting a first message with a first payload to the user via an authentication service associated with the multi-tenant system, where the first payload includes at least the encrypted token, receiving, from the user via the authenticator application, a request to initiate the initial enrollment of the user on a device associated with the user, where the request includes the encrypted token, and enrolling the user in the authenticator application on the device based on decryption of the encrypted token using an encryption key on a near-field communication (NFC) device that is associated with the user.

An apparatus for authenticator enrollment in a multi-tenant system is described. The apparatus may include one or more memories storing processor executable code, and one or more processors coupled with the one or more memories. The one or more processors may individually or collectively operable to execute the code to cause the apparatus to encrypt a token that is usable for an initial enrollment of a user in an authenticator application associated with the multi-tenant system, where the user is associated with a tenant of the multi-tenant system, transmit a first message with a first payload to the user via an authentication service associated with the multi-tenant system, where the first payload includes at least the encrypted token, receive, from the user via the authenticator application, a request to initiate the initial enrollment of the user on a device associated with the user, where the request includes the encrypted token, and enroll the user in the authenticator application on the device based on decryption of the encrypted token using an encryption key on an NFC device that is associated with the user.

Another apparatus for authenticator enrollment in a multi-tenant system is described. The apparatus may include means for encrypting a token that is usable for an initial enrollment of a user in an authenticator application associated with the multi-tenant system, where the user is associated with a tenant of the multi-tenant system, means for transmitting a first message with a first payload to the user via an authentication service associated with the multi-tenant system, where the first payload includes at least the encrypted token, means for receiving, from the user via the authenticator application, a request to initiate the initial enrollment of the user on a device associated with the user, where the request includes the encrypted token, and means for enrolling the user in the authenticator application on the device based on decryption of the encrypted token using an encryption key on an NFC device that is associated with the user.

A non-transitory computer-readable medium storing code for authenticator enrollment in a multi-tenant system is described. The code may include instructions executable by one or more processors to encrypt a token that is usable for an initial enrollment of a user in an authenticator application associated with the multi-tenant system, where the user is associated with a tenant of the multi-tenant system, transmit a first message with a first payload to the user via an authentication service associated with the multi-tenant system, where the first payload includes at least the encrypted token, receive, from the user via the authenticator application, a request to initiate the initial enrollment of the user on a device associated with the user, where the request includes the encrypted token, and enroll the user in the authenticator application on the device based on decryption of the encrypted token using an encryption key on an NFC device that is associated with the user.

Some examples of the method, apparatus, and non-transitory computer-readable medium described herein may further include operations, features, means, or instructions for receiving, from an administrator of the tenant, a first request for the initial enrollment of the user in the authenticator application, where encrypting the token may be in response to the first request.

Some examples of the method, apparatus, and non-transitory computer-readable medium described herein may further include operations, features, means, or instructions for generating one or more encryption keys via the authentication service in response to the first request, where the one or more encryption keys include at least the encryption key.

In some examples of the method, apparatus, and non-transitory computer-readable medium described herein, the NFC device includes a second payload that includes at least the encryption key.

In some examples of the method, apparatus, and non-transitory computer-readable medium described herein, the second payload further includes an algorithm used to encrypt the token, an identifier of a key used to encrypt the token, data associated with the encryption key, a link to the authenticator application, or metadata usable for linking the encrypted token with the second payload, or any combination thereof.

In some examples of the method, apparatus, and non-transitory computer-readable medium described herein, the first payload further includes an indication of the tenant, an identifier of a key used to encrypt the token, or metadata associated with the decryption of the encrypted token, or any combination thereof.

Some examples of the method, apparatus, and non-transitory computer-readable medium described herein may further include operations, features, means, or instructions for transmitting, to the user in response to the request, a second request for the user to verify possession of the NFC device, where decryption of the encrypted token using the encryption key on the NFC device may be based on the user possessing the NFC device.

In some examples of the method, apparatus, and non-transitory computer-readable medium described herein, enrolling the user in the authenticator application on the device may include operations, features, means, or instructions for receiving the encryption key from the NFC device in response to the second request, decrypting the encrypted token via the authenticator application on the device using the encryption key, and enrolling the user in the authenticator application on the device using the decrypted token.

In some examples of the method, apparatus, and non-transitory computer-readable medium described herein, enrolling the user in the authenticator application on the device may include operations, features, means, or instructions for transmitting, via the authenticator application on the device, the encrypted token to the NFC device for decryption on the NFC device, where transmitting the encrypted token to the NFC device may be based on the user successfully verifying possession of the NFC device, receiving the decrypted token from the NFC device, and enrolling the user in the authenticator application on the device using the decrypted token.

In some examples of the method, apparatus, and non-transitory computer-readable medium described herein, transmitting the first message may include operations, features, means, or instructions for transmitting the first message via electronic mail, a short messaging service, or a machine-readable code, or any combination thereof.

In some examples of the method, apparatus, and non-transitory computer-readable medium described herein, encrypting the token may include operations, features, means, or instructions for encrypting the token using a public key of an asymmetric keypair, where the encryption key includes a private key of the asymmetric keypair.

In some examples of the method, apparatus, and non-transitory computer-readable medium described herein, encrypting the token may include operations, features, means, or instructions for encrypting the token using the encryption key, where the encryption key includes a symmetric key.

In some examples of the method, apparatus, and non-transitory computer-readable medium described herein, the token includes an enrollment-permissioned bearer or a one-time token.

A method for user authentication in a multi-tenant system by an apparatus is described. The method may include receiving, via an authentication service of the multi-tenant system, a first request for access by a user to a resource using an authenticating application on a device, transmitting an authentication challenge to the authenticating application via the authentication service in response to the first request, generating an ephemeral server via an authenticator application on the device, where the authenticator application is usable for validating an identity of the user associated with the first request, receiving a message from the authenticating application via a connection established between the authenticating application and the ephemeral server, where the message includes the authentication challenge and a header that is indicative of an origin of the first request, receiving, from the authenticator application, a response to the authentication challenge that includes information indicative of the origin of the first request, and responding to the first request via the authentication service in accordance with a determination of whether the origin is authorized for requesting access to the resource.

An apparatus for user authentication in a multi-tenant system is described. The apparatus may include one or more memories storing processor executable code, and one or more processors coupled with the one or more memories. The one or more processors may individually or collectively operable to execute the code to cause the apparatus to receive, via an authentication service of the multi-tenant system, a first request for access by a user to a resource using an authenticating application on a device, transmit an authentication challenge to the authenticating application via the authentication service in response to the first request, generate an ephemeral server via an authenticator application on the device, where the authenticator application is usable for validating an identity of the user associated with the first request, receive a message from the authenticating application via a connection established between the authenticating application and the ephemeral server, where the message includes the authentication challenge and a header that is indicative of an origin of the first request, receive, from the authenticator application, a response to the authentication challenge that includes information indicative of the origin of the first request, and respond to the first request via the authentication service in accordance with a determination of whether the origin is authorized for requesting access to the resource.

Another apparatus for user authentication in a multi-tenant system is described. The apparatus may include means for receiving, via an authentication service of the multi-tenant system, a first request for access by a user to a resource using an authenticating application on a device, means for transmitting an authentication challenge to the authenticating application via the authentication service in response to the first request, means for generating an ephemeral server via an authenticator application on the device, where the authenticator application is usable for validating an identity of the user associated with the first request, means for receiving a message from the authenticating application via a connection established between the authenticating application and the ephemeral server, where the message includes the authentication challenge and a header that is indicative of an origin of the first request, means for receiving, from the authenticator application, a response to the authentication challenge that includes information indicative of the origin of the first request, and means for responding to the first request via the authentication service in accordance with a determination of whether the origin is authorized for requesting access to the resource.

A non-transitory computer-readable medium storing code for user authentication in a multi-tenant system is described. The code may include instructions executable by one or more processors to receive, via an authentication service of the multi-tenant system, a first request for access by a user to a resource using an authenticating application on a device, transmit an authentication challenge to the authenticating application via the authentication service in response to the first request, generate an ephemeral server via an authenticator application on the device, where the authenticator application is usable for validating an identity of the user associated with the first request, receive a message from the authenticating application via a connection established between the authenticating application and the ephemeral server, where the message includes the authentication challenge and a header that is indicative of an origin of the first request, receive, from the authenticator application, a response to the authentication challenge that includes information indicative of the origin of the first request, and respond to the first request via the authentication service in accordance with a determination of whether the origin is authorized for requesting access to the resource.

Some examples of the method, apparatus, and non-transitory computer-readable medium described herein may further include operations, features, means, or instructions for activating the authenticator application on the device based on the authenticator application being usable for validating the identity of the user associated with the first request, where generating the ephemeral server may be based on activating the authenticator application.

Some examples of the method, apparatus, and non-transitory computer-readable medium described herein may further include operations, features, means, or instructions for transmitting, via the authentication service, a first message to activate the authenticator application, where activating the authenticator application may be in response to the first message, and where the first message includes a link to the authenticator application or a push notification.

In some examples of the method, apparatus, and non-transitory computer-readable medium described herein, activating the authenticator application on the device may include operations, features, means, or instructions for activating the authenticator application for a duration that may be based on an execution time associated with the authentication challenge.

In some examples of the method, apparatus, and non-transitory computer-readable medium described herein, generating the ephemeral server may include operations, features, means, or instructions for generating the ephemeral server using a public domain and a certificate, where the public domain and the certificate may be hosted by the authentication service.

In some examples of the method, apparatus, and non-transitory computer-readable medium described herein, the origin corresponds to a website and the determination of whether the origin may be authorized for requesting access to the resource includes a determination of whether the website may be included in a set of websites authorized for requesting access to the resource.

In some examples of the method, apparatus, and non-transitory computer-readable medium described herein, the set of websites may be based on the user, a tenant of the multi-tenant system that may be associated with the user, or both.

DETAILED DESCRIPTION

Figure 1:
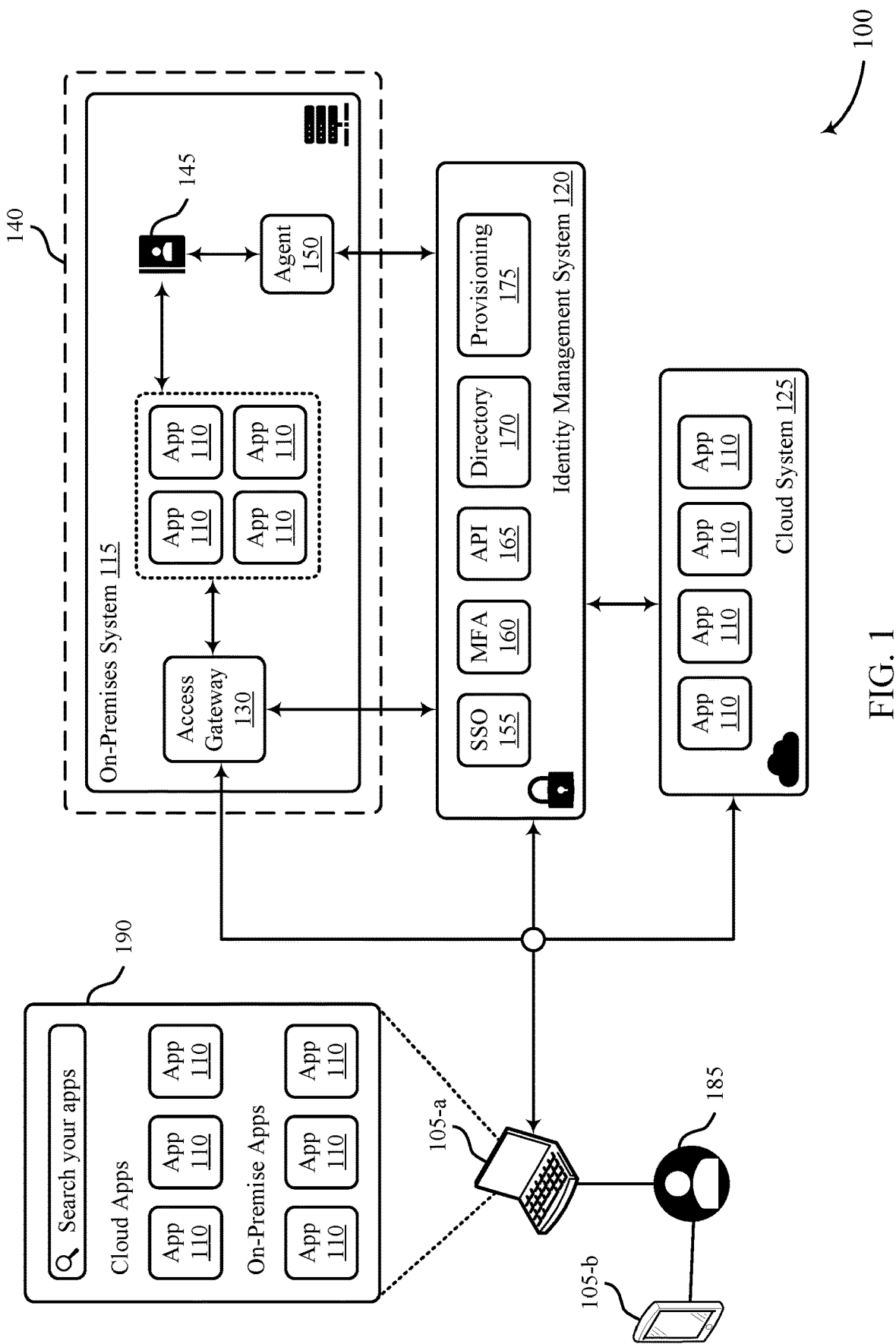
FIGS. 1 and 2 each illustrate an example of a computing system that supports techniques for phishing-resistant enrollment and on-device authentication in accordance with aspects of the present disclosure.

Some organizations may use an authentication service to manage identifying information associated with users of the organizations. Such authentication services may be referred to as identity provider (IdPs) or authentication platforms. For example, an authentication service may be an example of an authentication platform (e.g., a software platform, a service) that stores and manages digital identities of users. In some examples, an organization may use an authentication service to manage access to resources associated with the organization. For example, the authentication service may use one or more authenticators, such as authenticator applications, to manage access to resources for users of the organization. Authenticator applications may include enrollment channels. As described herein, an enrollment channel may include a medium over which information may be transferred from an authentication server of the authentication service to an authenticator application for enrollment of the authenticator application on a client device. That is, the authentication service may use an enrollment channel to transfer various information to an authenticator application, such that the authenticator application may be enrolled on a client device. Information transferred from the authentication service to the authenticator application via the enrollment channel may include a shared secret (e.g., such that both the client device and authentication server can generate the same time-based one-time password codes) or a short-lived access token. Some enrollment channels, however, may not be phishing resistant. That is, some enrollment channels may be susceptible to phishing attacks in which an attacker may intercept sensitive data (e.g., the shared secret or access token) transferred via the enrollment channels.

Various aspects of the present disclosure may provide a framework for phishing-resistant enrollment. For example, in accordance with one or more techniques for phishing-resistant enrollment and on-device authentication, as described herein, the authentication service may establish a phishing-resistant enrollment channel using a near-field communication (NFC) device. The authentication service may encrypt an enrollment token using a key. The enrollment token may be usable for enrolling the user in the authenticator application on the client device (e.g., the enrollment token may be an enrollment-permissioned bearer or one-time token). Additionally, the enrollment token may be decrypted using an encryption key stored on the NFC device. For example, the authentication service may encrypt the enrollment token using a symmetric key, which may also be stored on the NFC device. In some other examples, the authentication service may encrypt the enrollment token using a public key of an asymmetric keypair and a private key of the asymmetric keypair may be stored on the NFC device.

The user may obtain the NFC device, for example, from an administrator of the organization. Additionally, the authentication service may provide the user with the encrypted enrollment token. In some examples, the authentication service may send the encrypted enrollment token to the user digitally, such as via a machine-readable code (e.g., QR code), email, or a short message service (SMS). The user may initiate an initial enrollment for the authenticator application on the client device. In accordance with the enrollment, the user may use the client device to scan the NFC device (e.g., obtained from the administrator). The processes of scanning the NFC device may cause decryption of the encrypted enrollment token (e.g., on the NFC device or the client device). The authenticator application may use the decrypted enrollment token to complete enrollment of the authenticator application for the user on the client device. In some examples, NFC-based initial enrollment may enable the authentication service to reduce a likelihood of an attacker compromising (e.g., bypassing) phishing resistant characteristics of the authenticator application.

The authentication service may use one or more enrolled phishing-resistant authenticator applications to authenticate the identity of the user for access to a resource. For example, the user may attempt to access a resource while viewing a website on an authenticating application (e.g., a browser). In such an example, the authentication service may request that the authenticating application use a phishing-resistant authenticator application to verify the identity of the user. However, some phishing-resistant authenticators may lack a mechanism, much less an effective mechanism, for determining whether the website is malicious and granting the user access to the resource while on a malicious website may lead to one or more security vulnerabilities for the organization.

Various aspects of the present disclosure may also provide one or more techniques for phishing-resistant on-device authentication. For example, in accordance with one or more other techniques for phishing-resistant enrollment and on-device authentication, as described herein, the authentication service may enable phishing-resistant on-device authentication using an ephemeral web server running locally on the device. In some examples, the user may view (e.g., open) a website via an authenticating application. Additionally, the user may attempt to access a resource protected by the authentication service via the website. Accordingly, while on the website, the authenticating application may transmit an access request to the authentication service. In response, the authentication service may issue an authentication challenge to the authenticating application. The authentication challenge may request that the authenticating application verify (e.g., prove) the identity of the user using a phishing-resistant authenticator, such as the authenticator application. Accordingly, to satisfy the authentication challenge, the authenticating application may determine to establish a connection with the authenticator application to verify the identity of the user for access to the resource.

For example, the authenticator application may generate an ephemeral server and the authenticating application may establish a connection with the ephemeral server. To authenticate the identity of the user, the authenticating application may use the established connection to transmit the authentication challenge to the ephemeral server while on the website. As such, the authentication challenge may be indicative of the website. For example, the authenticator application (e.g., the ephemeral server of the authenticator application) may determine the website that the authenticating application is on (and that the user is viewing) from the authentication challenge (e.g., from information included in a header of the authentication challenge, such as domain origin information). Additionally, the authenticator application may report the website to the authentication service, for example, as metadata included in a response to the authentication challenge. The authentication service may determine whether the website is authorized (e.g., present in an allow-list) for requesting access to the resource and may respond to the access request accordingly. In some examples, by using an ephemeral server to resolve authentication challenges, the authentication service may reduce a likelihood of an attacker compromising (e.g., bypassing) security for the organization.

Aspects of the disclosure are initially described in the context of computing systems and process flows. Aspects of the disclosure are further illustrated by and described with reference to apparatus diagrams, system diagrams, and flowcharts that relate to techniques for phishing-resistant enrollment and on-device authentication.

FIG. 1 illustrates an example of a computing system 100 that supports techniques for phishing-resistant enrollment and on-device authentication in accordance with various aspects of the present disclosure. The computing system 100 includes one or more client devices 105 (a client device 105-*a* and a client device 105-*b*), which may be examples of a desktop, laptop, smartphone, tablet, or the like. A client device may also be referred to herein as a computing device. The computing system 100 also includes an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to)

database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120. In some examples, the identity management system 120 may support a database system such as a multi-tenant database system. In such cases, the identity management system may serve multiple client devices 105 with a single instance of software. However, other types of systems may be implemented, including—but not limited to—client-server systems, mobile device systems, and mobile network systems. The identity management system 120 may receive data associated with various interactions from the client device 105-a (or the client device 105-b) over a network connection, and may store and analyze the data. In some examples, the identity management system 120 may receive data directly from an interaction between an application 110 and the client device 105-a. In some examples, the client device 105-a may develop applications to run on the identity management system 120. The identity management system 120 (e.g., one or more services of the identity management system 120) may be implemented using remote servers.

Applications 110 may interact with the client device 105-a via email, web, text messages, or any other suitable form of interaction. For example, an interaction may be a business-to-business (B2B) interaction or a business-to-consumer (B2C) interaction. An application 110 may also be referred to as a customer, a client, a website, or some other suitable terminology. In some examples, the application 110 may be an example of a server, a node, a computer cluster, or any other type of computing system, component, or environment. In some examples, the application 110 may be operated by a user or a group of users.

As described herein, the computing system 100 may support one or more configurations for providing multi-tenant functionality. For example, the identity management system 120 may be an example of a multi-tenant system. Accordingly, the identity management system 120 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The identity management system 120 may support scaling of tenants within the multi-tenant system, for example, using scale triggers, automatic scaling procedures, scaling requests, or any combination thereof. In some cases, the identity management system 120 may implement one or more scaling rules to enable relatively fair sharing of resources across tenants. For example, a tenant may have a threshold quantity of processing resources, memory resources, or both to use, which in some cases may be tied to a subscription by the tenant.

A user 185 may interact with the client devices 105 to communicate with one or more of the on-premises system 115, the identity management system 120, or the cloud system 125. For example, the user 185 may access one or more applications 110 by interacting with an interface 190 of the client device 105-a. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the client device 105-a). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the client device 105-*a* (e.g., the browser or application 110 running on the client device 105). In some examples, the application 110 may be associated with a service provider (SP), which may host or manage the application 110. In such examples, the client device 105-*a* may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

The computing system 100 may support a framework for phishing-resistant enrollment. For example, in accordance with one or more techniques for phishing-resistant enrollment and on-device authentication, as described herein, an authentication service of the identity management system 120 may establish a phishing-resistant enrollment channel using an NFC device. The authentication service may encrypt an enrollment token using a key, such as a symmetric key or a public key of an asymmetric keypair. The enrollment token may be decrypted using an encryption key stored on the NFC device. For example, the NFC device may store the symmetric key or a private key of the asymmetric keypair. An administrator may physically provide the user 185 with the NFC device, for example, in person or via mail. Additionally, the authentication service may provide the user 185 with the encrypted enrollment token, for example, a machine-readable code (e.g., QR code), email, or an SMS. As an illustrative example, the user 185 may obtain a QR code with the encrypted enrollment token on the client device 105-*a* and may scan the QR code with the client device 105-*b* to initiate an initial enrollment for an authenticator application on the client device 105-*b*. Additionally, in accordance with the enrollment, the user 185 may use the client device 105-*b* to scan the NFC device (e.g., obtained from the administrator). The processes of scanning the NFC device may cause decryption of the encrypted enrollment token (e.g., on the NFC device or the client device 105-*b*). The authenticator application may use the decrypted enrollment token to complete enrollment of the authenticator application for the user 185 on the client device 105-*b*. In some examples, NFC-based initial enrollment may enable the authentication service to reduce a likelihood of an attacker compromising (e.g., bypassing) phishing resistant characteristics of the authenticator application.

The computing system 100 may also support one or more techniques for phishing-resistant on-device authentication. For example, in accordance with one or more other techniques for phishing-resistant enrollment and on-device authentication, as described herein, the authentication service may enable phishing-resistant on-device authentication using an ephemeral server. In some examples, the user 185 may view (e.g., open) a website via an authenticating application on the client device 105-b. Additionally, the user 185 may attempt to access a resource protected by the authentication service via the website. Accordingly, while on the website, the authenticating application may transmit an access request to the authentication service. In response, the authentication service may issue an authentication challenge to the authenticating application. The authentication challenge may request that the authenticating application verify (e.g., prove) the identity of the user 185 using a phishing-resistant authenticator, such as the authenticator application. Accordingly, to satisfy the authentication challenge, the authenticating application may determine to establish a connection with the authenticator application to verify the identity of the user 185 for access to the resource.

For example, the authenticator application may generate an ephemeral server on the client device 105-a and the authenticating application may establish a connection with the ephemeral server. To authenticate the identity of the user 185, the authenticating application may use the established connection to transmit the authentication challenge to the ephemeral server while on the website. As such, the authentication challenge may be indicative of the website. For example, the authenticator application (e.g., the ephemeral server of the authenticator application) may determine the website that the authenticating application is on (and that the user 185 is viewing) from the authentication challenge (e.g., from information included in a header of the authentication challenge, such as domain information). Additionally, the authenticator application may report the website to the authentication service, for example, as metadata included in a response to the authentication challenge. The authentication service may determine whether the website is authorized for requesting access to the resource and may respond to the access request accordingly. In some examples, by using an ephemeral server to resolve authentication challenges, the authentication service may reduce a likelihood of an attacker compromising (e.g., bypassing) security for the organization.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

Figure 2:
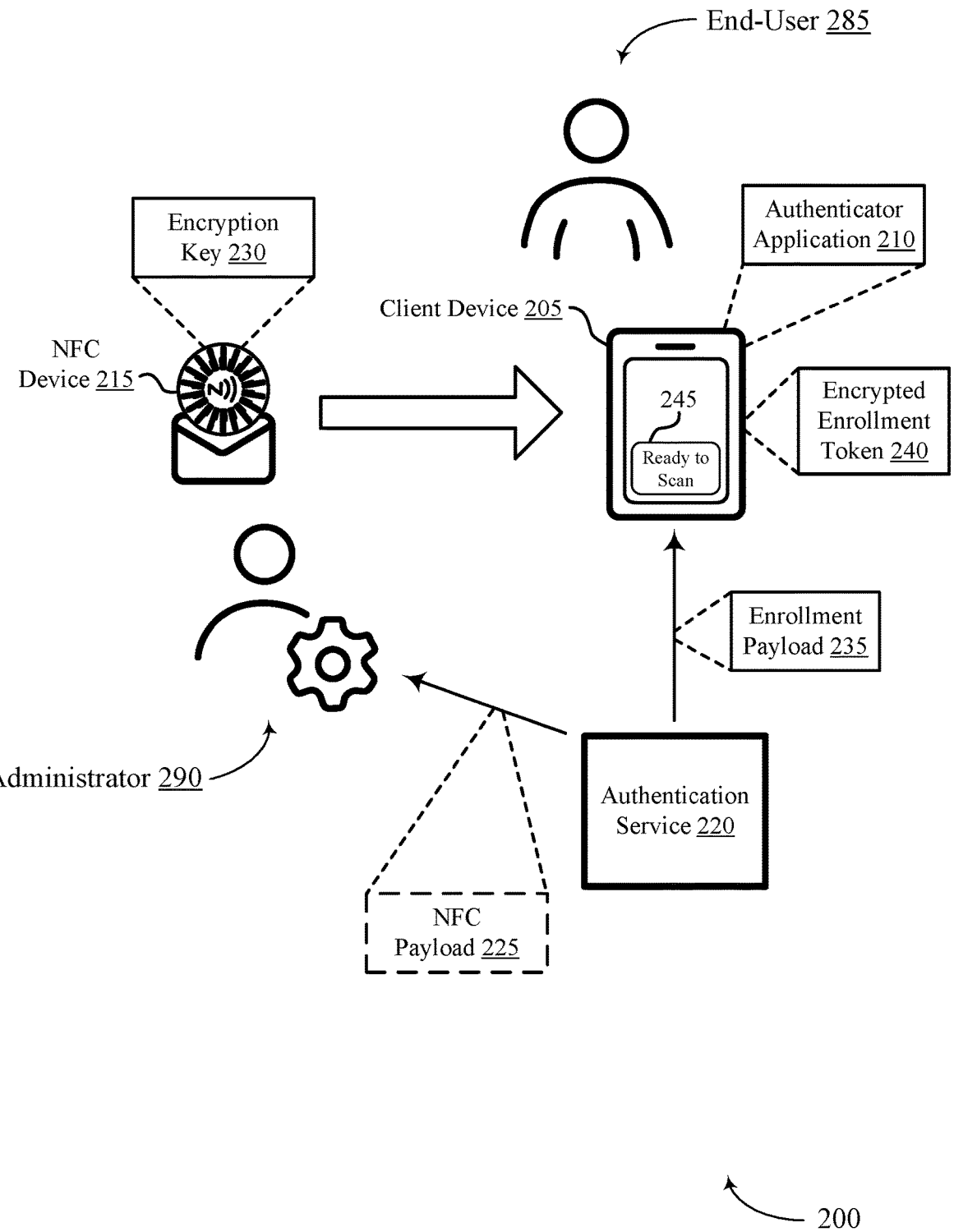

FIG. 2 shows an example of a computing system 200 that supports techniques for phishing-resistant enrollment and on-device authentication in accordance with aspects of the present disclosure. The computing system 200 may include an authentication service 220, which may be an example of one or more services of an identity management system (e.g., a multi-tenant system, an authentication system) illustrated by and described with reference to FIG. 1. Additionally, the computing system 200 may include an end-user 285 and an administrator 290, which may be examples of a user illustrated by and described with reference to FIG. 1. For example, the administrator 290 and the end-user 285 may be part of an organization, such as a business, an enterprise, a non-profit, a startup, or any other organization type that employs one or more services of the identity management system. That is, the administrator 290 and the end-user 285 may be associated with a tenant of the multi-tenant system. The end-user 285 may operate a client device 205, which may be an example of a client device illustrated by and described with reference to FIG. 1. The computing system 200 may include an authenticator application 210, which may be an example of an application illustrated by and described with reference to FIG. 1.

In the example of FIG. 2, the organization (e.g., the administrator 290 of the organization) may use the authentication service 220 (e.g., an IdP) to manage access to one or more resources (e.g., applications) associated with the organization. The organization may also use the authentication service 220 to manage identifying information associated with the end-user 285, such that the end-user 285 may access one or more of the resources via the authentication service 220. For example, the authentication service 220 may manage login requests from the end-user 285, authenticate the identity of the end-user 285 for the login requests, and authorize access to one or more of the resources managed by the authentication service 220 (e.g., protected resources) based on the authentication.

Some authentication services may be susceptible to one or more categories of attacks, such as phishing. Phishing is a relatively common (e.g., the most common) cause of account takeover for organizations. Accordingly, the authentication service 220 may use phishing resistant MFA to manage access to resources. In some cases, phishing resistant MFA may be referred to as (e.g., may be considered as) an effective method (e.g., the gold standard) for preventing this category of attacks (phishing attacks). The authentication service 220 may use device-bound authenticators, such as the authenticator application 210, to implement phishing resistant MFA. That is, device-bound authenticators may provide (e.g., may be assumed to provide) phishing resistance. In some examples, however, an attacker or malicious user may bypass the phishing resistance of authenticator applications. For example, the attacker may bypass phishing resistance of the authenticator application 210 by fraudulently obtaining credentials associated with the end-user 285 (e.g., phish credentials) and using the phished credentials to enroll the authenticator application 210 on another client device (e.g., an untrusted device) used by the attacker. In this way, the attacker may invoke the authenticator application 210 (e.g., on the untrusted machine) to fraudulently access resources of the organization. In other words, the attacker may bypass phishing resistance characteristics of the authenticator application 210 (e.g., may render the phishing resistant characteristic of the authenticator application 210 ineffective) by using fraudulently obtained credentials to enroll the authenticator application 210 on an untrusted device.

In some cases, the organization may rely on device trust to reduce a likelihood of the phishing resistance characteristics of the authenticator application 210 from being bypassed by an attacker. That is, the organization may use trusted devices to prevent attackers from enrolling the authenticator application 210 via phishing. Some device trust mechanisms may necessitate that a device has a chain of trust with the organization in order to enroll with the authentication service 220 (e.g., for accessing resources). A chain of trust may be established by the organization providing the end-user 285 with the client device 205 (e.g., directly) or by employing a device management solution on the client device 205. In some examples, however, the client device 205 may be unmanaged (e.g., owned by the end-user 285, such as a mobile device). It may be relatively difficult to establish a chain of trust with unmanaged devices (e.g., user-owned devices or company supplied but unmanaged devices) and, as such, may be problematic for mobile devices and remote work scenarios.

Additionally, or alternatively, the organization may use a phishing-resistant method for enrollment to reduce a likelihood of the phishing resistance characteristics of the authenticator application 210 from being bypassed by an attacker. However, some phishing-resistant enrollment methods may necessitate that at least one device already be enrolled. Such phishing-resistant methods may be relatively ineffective if the already enrolled device is compromised (or if a user lacks a previously enrolled device). Accordingly, the organization may constrain initial enrollment of the authenticator application 210 for the end-user 285 to one or more phishing-resistant methods. In some examples, by constraining the initial enrollment of the authenticator application to a phishing-resistant method, the authentication service 220 may reduce a likelihood of (e.g., may prevent) the phishing resistance characteristics of the authenticator application 210 being bypassed by the attacker.

As described herein, an initial enrollment may refer to a first enrollment (e.g., on a first device) by a user. For example, the end-user 285 may be joining the organization (e.g., for the first time) and may determine to enroll the client device 205 (e.g., an unmanaged device) for accessing resources of the organization. Access to the resources may be managed by (e.g., protected by) the authentication service 220. For example, to grant the end-user 285 access to a resource, the authentication service 220 may request that the identity of the end-user be authenticated via one or more authenticators, such as the authenticator application 210. Accordingly, to reduce a likelihood of the phishing resistance characteristics of the authenticator application 210 from being bypassed the authentication service 220 may use a phishing-resistant enrollment method for the initial enrollment of the authenticator application 210 for the end-user 285 on the client device 205. That is, the authentication service 220 may request that the end-user 285 may perform an initial enrollment of the authenticator application 210 on the client device 205 in a phishing-resistant manner. In some examples, after successfully enrolling the authenticator on the client device 205 (e.g., after the initial enrollment), the end-user 285 may perform subsequent enrollments of the authenticator application 210 on one or more other client devices.

Some mechanisms for phishing-resistant enrollment may include the use of pre-enrolled hardware keys (e.g., hardware devices that include phishing-resistant authenticators). In accordance with such mechanisms, the organization (e.g., the administrator 290) may pre-enroll a hardware key and then provide (e.g., physically send) the hardware key to the end-user 285. Pre-enrollment of a hardware key may refer to the enrollment of a hardware key with an authentication system prior to use by an intended user. The end-user 285 may then use the pre-enrolled hardware key on one or multiple devices to enroll a phishing-resistant authenticator, such as a device-bound key or the authenticator application 210. In some cases, because the hardware key is pre-enrolled (e.g., enrolled before being provided to the end-user 285), the hardware key may be enrolled for an unconstrained (e.g., unknown) length of time. The enrollment of hardware keys for a constrained length of time may lead to security vulnerabilities for the organization. For example, after the hardware key is pre-enrolled, an attacker may fraudulently obtain (e.g., steal, intercept, or copy) the hardware key and use the hardware key to enroll the authenticator application 210 (e.g., immediately, without performing any type of authentication). Because the attacker enrolled the authenticator application 210 using the fraudulently obtained hardware key, the phishing resistant characteristic of the authenticator application 210 may be rendered ineffective. In some cases, hardware keys may be relatively expensive (e.g., may cost about $20-100+ per user). Additionally, some hardware keys may be cumbersome for users (e.g., necessitates that the users keep track of an extra device) and, as such, some users may determine not to use the hardware key after initial enrollment (e.g., may use it to bootstrap another phishing resistant credential such as Web Authentication (WebAuthN)), which may lead to security vulnerabilities and may be uneconomical (e.g., wasteful) for the organization.

In some other examples, the authentication service 220 may support NFC-based phishing resistant enrollment as described herein. For example, in accordance with techniques for phishing-resistant enrollment and on-device authentication, as described herein, the authentication service 220 may use an NFC device 215 (e.g., may replace expensive hardware key with a less expensive NFC device, such as a tag or sticker, which holds a secret key) for phishing resistant enrollment of the authenticator application 210 on the client device 205. The NFC device 215 may preserve the physical connection of a hardware key handover, may be relatively inexpensive (e.g., may costs ~$1 per key for non-cloneable keys, or less for cloneable ephemeral keys), and may provide for bootstrapped enrollment on the client device 205, which may then be securely transferred to another device (e.g., via Bluetooth®).

As illustrated in the example of FIG. 2, the authentication service 220 may encrypt a token (e.g., an enrollment-permissioned bearer or a one-time token) that is usable for an initial enrollment of the end-user 285 in the authenticator application 210. The authenticator application 210 may be an authenticator application that is part of the identity management system. Alternatively, the authenticator application 210 may be a third-party authenticator application. In such examples, the authentication service 220 may provide a mechanism for the authenticator application 210 to support the initial enrollment of the end-user 285 via the NFC device 215. For example, the authentication service 220 (or the identity management system) may provide the authenticator application 210 with a protocol or an SDK for the initial enrollment of the end-user 285 via the NFC device 215.

The administrator 290 may request NFC-based enrollment for the end-user 285 via the NFC device 215. The NFC device 215 may be registered with the authentication service 220. In accordance with the NFC-based enrollment, the authentication service 220 may obtain an encrypted enrollment token 240 by encrypting an enrollment token (e.g., a token usable for enrollment of the end-user 285) using a key. The encrypted enrollment token may be decrypted using an encryption key 230 on the NFC device 215. The encryption key 230 may include the key used to encrypt the encrypted enrollment token 240, or the encryption key 230 may include another key that is associated with the key used to encrypt the encrypted enrollment token 240.

For example, the authentication service 220 may use (e.g., generate, create, or otherwise obtain) a keypair for encrypting the enrollment token. The keypair may be an example of a public-private keypair, also referred to as an asymmetric keypair. In such an example, the authentication service 220 may encrypt the enrollment token using the public key of the keypair. That is, the encryption key 230 may include the private key of the keypair and the key used to encrypt the encrypted enrollment token 240 may include the public key of the keypair. In some examples, the keypair may include a hardware-bound public-private key pair (e.g., an elliptic curve keypair, such as an EC256) on the NFC device 215. In such examples, the public key may be read from the NFC device 215 by the authentication service 220 (e.g., for the encryption). Alternatively, the keypair may include a keypair generated by the authentication service 220. In such an example, the public key may be stored on a server associated with the authentication service 220 (e.g., for the encryption).

In some other examples, the authentication service 220 may use (e.g., generate, create, or otherwise obtain) a symmetric key, such as an advanced encryption standard (AES) key, for encrypting the enrollment token. That is, the encryption key 230 may include the symmetric key and the key used to encrypt the encrypted enrollment token 240 may also be the symmetric key. In some examples, the symmetric key may include a hardware-bound symmetric key on a device, such as the NFC device 215. In such an example, the encryption operation may be performed on the device itself and returned to the authentication service 220. Alternatively, the symmetric key may include an ephemeral symmetric key. That is, the authentication service 220 may generate the ephemeral symmetric key, use the ephemeral symmetric key to encrypt the enrollment token, and then may write (or transmit to the administrator 290 to write) the ephemeral symmetric key to the NFC device 215. In such an example, the ephemeral symmetric key may not be stored on the server of the authentication service 220.

The key used for encrypting the enrollment token may be associated with the end-user 285. For example, the authentication service 220 may associate the used to encrypt the enrollment token (e.g., the public key or the symmetric key) with the end-user 285 and the encryption key 230 (e.g., the private key or the symmetric key) may be written to the NFC device 215. In some examples, the authentication service 220 may provide the administrator 290 (which may be in possession of the NFC device 215) with a local mechanism to write the encryption key 230 to the NFC device 215 (e.g., a sticker, tag, or card). For example, the authentication service 220 may transmit a message that includes an NFC payload 225 to the administrator 290 (e.g., via a client device, not shown). In such an example, the NFC payload 225 may include the encryption key 230 and the administrator 290 may use the local mechanism to write the NFC payload 225 to the NFC device 215. In some examples, the NFC payload 225 written to the NFC device 215 may include other data (e.g., unless already present on the NFC device 215, such as for examples in which the enrollment token is encrypted using hardware-bound keys). For example, the NFC payload 225 written to the NFC device 215 may include an algorithm (e.g., an algorithm used for encrypting the enrollment token), a public key identifier, private key data, or a link to the authenticator application 210, or some combination thereof. The administrator 290 may physically deliver the NFC device 215 to the end-user 285, for example, via mail or in person.

The authentication service 220 may provide the end-user 285 with the encrypted enrollment token 240. For example, the authentication service 220 may transmit a first message with an enrollment payload 235 to the end-user 285 (e.g., via the client device 205 or via another client device, not shown). The enrollment payload 235 may include the encrypted enrollment token 240. In other words, the authentication service 220 may encrypt an enrollment-permissioned bearer or one-time token to obtain the encrypted enrollment token 240, and then may send the encrypted enrollment token 240 to the end-user 285. In some examples, the authentication service 220 may send the encrypted enrollment token 240 to the end-user 285 digitally, such as via a machine-readable code (e.g., QR code), email, or a short message service (SMS). In some examples, in addition to the encrypted enrollment token 240 (e.g., an encrypted authenticator enrollment token, such as a bearer or one-time enrollment token) the enrollment payload 235 may include other data, such as metadata to describe the encryption key on the NFC device 215 (which may be used to decrypt the token). For example, the enrollment payload 235 (e.g., a URL-based payload) may include information indicative of an issuer of the registration token (e.g., an indicator of the organization), a key identifier of the key used to encrypt the enrollment token (e.g., an identifier of the public key, which may be referred to as a public key identifier), or key metadata used to decrypt the token (e.g., an initialization vector, the algorithm).

In some examples, in response to receiving the enrollment payload 235, the end-user 285 may initiate (e.g., create) an initial enrollment for the authenticator application 210 on the client device 205. For example, the authenticator application 210 may receive a request from the end-user 285 to initiate the initial enrollment of the end-user 285 on the client device 205. The request may include the encrypted enrollment token 240. In some examples, the authenticator application 210 may receive the request based on the end-user 285 clicking a link (e.g., included in an email or SMS message) or scanning a QR code that includes (or is otherwise usable for the authenticator application 210 to obtain) the encrypted enrollment token 240. That is, the processes of clicking the link or scanning the QR code may pass the encrypted enrollment token 240 to the authenticator application 210 (or the processes of clicking the link or scanning the QR code may otherwise enable the authenticator application 210 to obtain the encrypted enrollment token 240).

In some examples, in response to obtaining the encrypted enrollment token 240, the authenticator application 210 may request that the end-user 285 verify possession of the NFC device 215. For example, the authenticator application 210 may request that the end-user 285 to scan or tap the NFC device 215 with the client device 205. In some examples, the authenticator application 210 may display (or otherwise output) a message 245, which may prompt the end-user 285 to scan or tap the NFC device 215. In some examples, decryption of the encrypted enrollment token 240 may occur in response to scanning or tapping the NFC device 215 with the client device 205. For example, the NFC device 215 may pass the encryption key to the client device 205 for decrypting the encrypted enrollment token 240 on the client device 205 (e.g., via the authenticator application 210). In some other examples, the client device 205 (e.g., the authenticator application 210 on the client device 205) may pass the encrypted enrollment token to the NFC device 215 for decryption on the NFC device 215. In such examples, the NFC device 215 may perform the decryption operation to obtain the decrypted enrollment token and may then pass the decrypted enrollment token to the authenticator application 210. The authenticator application 210 may use the decrypted enrollment token to enroll the end-user 285 in the authenticator application 210 on the client device 205 via the authentication service 220. In other words, the authentication service 220 may enroll the end-user 285 in the authenticator application 210 on the client device 205 based on the decryption of the encrypted enrollment token 240 using the encryption key 230 on the NFC device 215.

In some examples, by using NFC-based initial enrollment, the authentication service 220 may reduce a likelihood of an attacker compromising (e.g., bypassing) the phishing resistant characteristic of the authenticator application 210. For example, because the NFC device 215 itself may not be not enrolled (e.g., may not be pre-enrolled by the administrator 290), the NFC-based approach may enable the enrollment to be created in response to the end-user 285 executing a workflow (e.g., clicking a link, scanning a QR code), which may provide increased security for the organization (e.g., compared to scenarios in which a hardware key is pre-enrolled for an unconstrained length of time).

Figure 3:
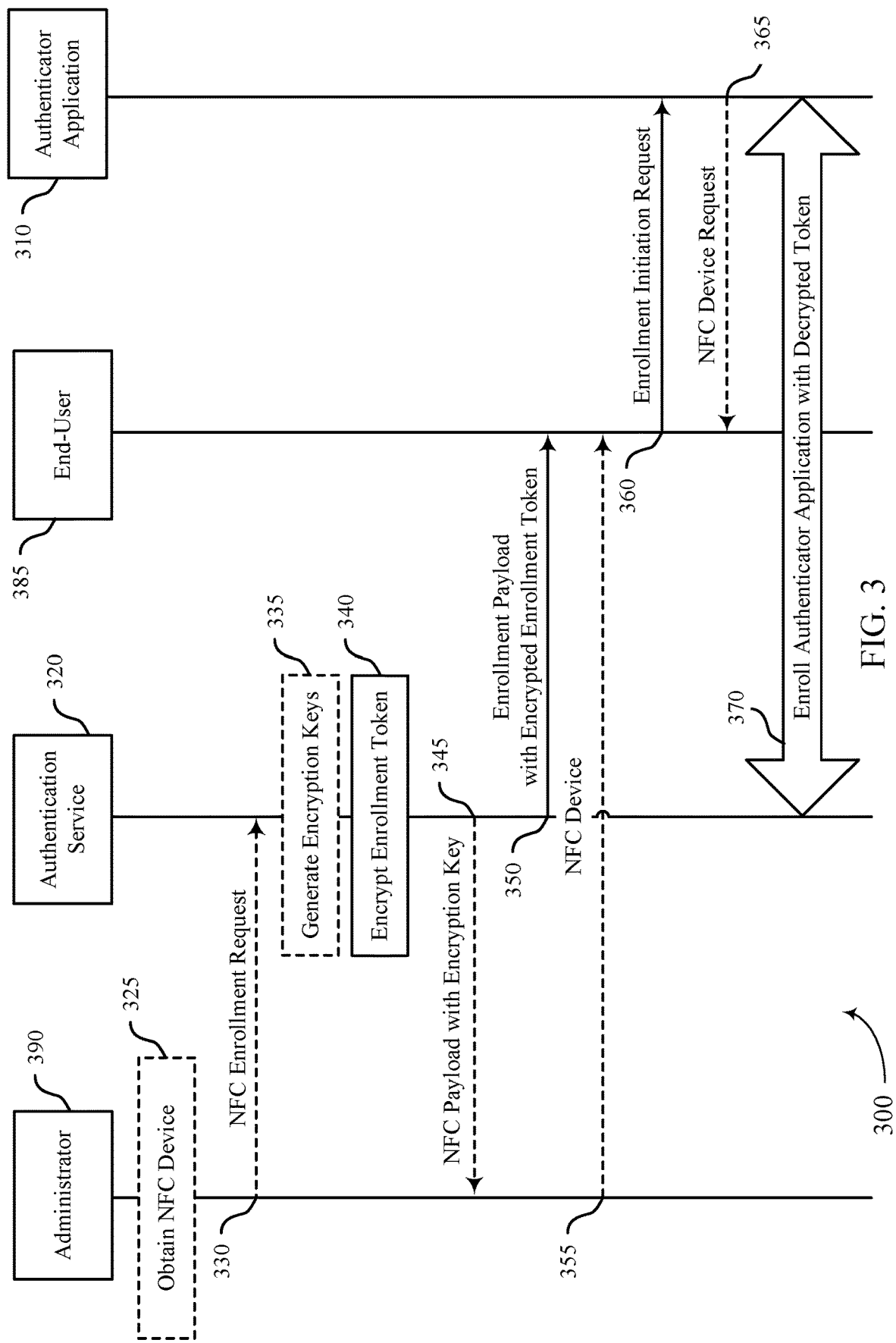
FIG. 3 shows an example of a process flow that supports techniques for phishing-resistant enrollment and on-device authentication in accordance with aspects of the present disclosure.

FIG. 3 shows an example of a process flow 300 that supports techniques for phishing-resistant enrollment and on-device authentication in accordance with aspects of the present disclosure. The process flow 300 may implement or be implemented by aspects of the computing system 100 and the computing system 200. For example, one or more aspects of the process flow 300 may be implemented by an administrator 390, which may be an example of an administrator (e.g., user) illustrated by and described with reference to FIGS. 1 and 2. Additionally, one or more aspects of the process flow 300 may be implemented by an end-user 385 (e.g., via a client device), which may be an example of a user illustrated by and described with reference to FIGS. 1 and 2. For example, the client device of the end-user 385 may host an authenticator application 310, which may be examples of an application illustrated by and described with reference to FIGS. 1 and 2. Additionally, one or more aspects of the process flow 300 may be implemented at a server hosting an authentication service 320, which may be an example of an authentication service illustrated by and described with reference to FIGS. 1 and 2. In the following description of the process flow 300, the information communicated between the administrator 390 (e.g., via another client device), the authentication service 320, the end-user 385 (e.g., via the client device), and the authenticator application 310 may be performed in different orders or at different times than shown. Additionally, or alternatively, some operations may be omitted from the process flow 300 and other operations may be added to the process flow 300. In some examples, two or more operations may be combined in the process flow 300 or a single operation may be divided into multiple operations. The process flow 300 may provide for improved authenticator enrollment, among other possible benefits. As illustrated in the example of FIG. 3, the administrator 390 (e.g., via another client device), the authentication service 320, the end-user 385 (e.g., via the client device), and the authenticator application 310 may support NFC-based authenticator enrollment.

For example, at 325, the administrator 390 may obtain an NFC device, such that the administrator 390 may be in possession of the physical NFC device. The NFC device may be an example of an NFC device illustrated by and described with reference to FIG. 2. For example, the NFC device may be a device with NFC capabilities, such as an NFC tag or sticker, among other examples. The NFC device may be registered with the authentication service 320 (e.g., the administrator 390 may register the NFC device with the authentication service 320 or the authentication service 320 may provide the administrator 390 with a registered NFC device).

In some examples, at 330, the authentication service 320 may receive an NFC enrollment request from the administrator 390. For example, the administrator 390 may determine to on-board the end-user 385 (e.g., a new employee). Accordingly, the administrator 390 may request for an initial enrollment of the end-user 385 in the authenticator application 310 using the NFC device obtained at 325, such that the end-user 385 may access one or more resources of the organization. In some examples, the administrator 390 may request NFC-based initial enrollment for the end-user 385 via a workflow with the authentication service 320. The NFC device may include an encryption key (e.g., a secret key). For example, the NFC device may include a symmetric key or a private key of an asymmetric keypair.

In some examples, at 335, the authentication service 320 may generate one or more encryption keys for the initial enrollment of the end-user 385. For example, the authentication service 320 may generate the symmetric key or the asymmetric keypair that includes the private key and a public key. The encryption key may be stored on the NFC device. That is, the NFC device may include a payload (e.g., an NFC payload) that includes at least the encryption key. For some examples in which the authentication service 320 generates the asymmetric keypair, the private key may be stored on the NFC device (e.g., only stored on the NFC device) and the public key may be stored at the authentication service 320 (e.g., on a server of the authentication service 320).

At 340, the authentication service 320 may encrypt an enrollment token for the initial enrollment of the end-user 385 in the authenticator application 310. The enrollment token may be an example of a token illustrated by and described with reference to FIG. 2. For example, the enrollment token may be an example of an enrollment-permissioned bearer or a one-time token (e.g., a single-use token). The authentication service 320 may encrypt the enrollment token using a key. For example, the authentication service 320 may use the symmetric key or the public key of the asymmetric keypair to encrypt the enrollment token. Decryption of the enrollment token may be based on the encryption key stored on the NFC device. In other words, the encrypted enrollment token may be unusable (e.g., ineffective) without the NFC device (e.g., other NFC devices may have no effect on the encrypted enrollment token).

In some examples, at 345, the authentication service 320 may transmit the NFC payload with the encryption key to the administrator 390. For example, the authentication service 320 may transmit the NFC payload (or may otherwise provide the administrator 390 with the NFC payload), such that the administrator 390 may write the NFC payload to the NFC device. The administrator 390 may use the authenticator application 310 or another third-party application (e.g., any local application that is able to write data to an NFC device) to write the NFC payload to the NFC device. The NFC payload may include (e.g., in addition to the encryption key) an algorithm used to encrypt the enrollment token (e.g., at 340) or a link to the authenticator application 310, or both.

Additionally, the NFC payload may include information indicative of an association between the NFC device and the end-user 385. For example, the NFC payload may include a first key identifier (e.g., an identifier of the key used to encrypt the token, such as an identifier of the symmetric key or the public key of the asymmetric keypair, which may be associated with the end-user 385), data associated with the encryption key, or metadata usable for linking the encrypted enrollment token with the NFC payload, or any combination thereof. That is, the NFC device may include metadata that may be used to link the encrypted enrollment token with the NFC device payload (e.g., an organization identifier, a user identifier, an organization URL). Accordingly, the NFC device (e.g., the encryption key on the NFC device) may be unusable (e.g., ineffective) without the encrypted enrollment token (e.g., phishing emails that lack the encrypted enrollment token associated with the NFC device may be ineffective).

At 350, the authentication service 320 may transmit an enrollment payload with the encrypted enrollment token to the end-user 385. For example, the authentication service 320 may transmit a first message with the enrollment payload to the end-user 385. In some examples, the authentication service 320 may transmit the first message via electronic mail, a short messaging service, or a machine-readable code, or any combination thereof. For example, the authentication service 320 may transmit an email to the end-user 385 that includes a link for obtaining the encrypted enrollment token. In such an example, the end-user 385 may open the link on a client device (e.g., a mobile device) to be enrolled with the authenticator application 310. In some other examples, the authentication service 320 may transmit an email to the end-user 385 that includes a machine-readable code (e.g., a QR code) for obtaining the encrypted enrollment token. In such an example, the end-user 385 may open the link on a second client device (e.g., a laptop) and may scan the QR code with the client device to be enrolled with the authenticator application 310 (e.g., with the mobile device). In some examples, the authentication service 320 may display the link (or QR code) to the end-user via a user interface (e.g., of the authenticator application 310). The enrollment payload may include information that is indicative of an association between the NFC device and the end-user 385. For example, the enrollment payload may include (e.g., in addition to the encrypted enrollment token) an indication of the organization (e.g., tenant) or a second key identifier (e.g., an identifier of a key used to encrypt the token, such as an identifier of the symmetric key or the public key of the asymmetric keypair, which may be associated with the end-user 385), or both. Additionally, or alternatively, the enrollment payload may include metadata associated with the decryption of the encrypted enrollment token, or any combination thereof.

In some examples, at 355, the administrator 390 may provide the end-user 385 with the NFC device. For example, the administrator 390 may mail or physically deliver the NFC device to the end-user 385. In some examples, the end-user 385 may verify their identity to obtain the NFC device (e.g., may provide proof of identity to the administrator to obtain the NFC device).

At 360, the authenticator application 310 may receive an enrollment initiation request from the end-user 385 via the client device. That is, the authenticator application 310 may receive a request to initiate the initial enrollment of the end-user 385 on the client device. In other words, the end-user 385 may initiate the initial enrollment on the client device. For example, to initiate (e.g., trigger) the initial enrollment on the client device, the end-user 385 may click the link or scan the QR code provided by the authentication service 320. Additionally, or alternatively, the end-user 385 may make a selection within the authenticator application 310 that may trigger the initial enrollment on the client device. The enrollment initiation request may include the encrypted enrollment token. In other words, by indicating the enrollment initiation request to the authenticator application 310 (e.g., by clicking the link or scanning the QR code), the end-user 385 may cause the encrypted enrollment token to be passed to the authenticator application 310.

In some examples, the authentication service 320 or the authenticator application 310 may use information included in the NFC payload and the enrollment payload to verify the association between the NFC device and the end-user 385. For example, the authentication service 320 or the authenticator application 310 may verify the association between the NFC device and the end-user 385 based on the first key identifier of the NFC payload matching the second key identifier of the enrollment payload.

In some examples, at 365, the authenticator application 310 may transmit (or otherwise display) an NFC device request to the end-user 385 in response to the enrollment initiation request. The NFC device request may be a request for the end-user 385 to verify possession of the NFC device. For example, authenticator application 310 may determine (e.g., detect) that the enrollment token is encrypted and, as such, may request that the end-user 385 to tap or scan the NFC device using the client device, such that the encrypted enrollment token may be decrypted.

In some examples, decryption of the encrypted enrollment token may occur on the client device (e.g., via the authenticator application 310). For example, the authenticator application 310 may receive (or otherwise obtain) the encryption key from the NFC device in response to the NFC device request (e.g., in response to the end-user 385 tapping or scanning the NFC device using the client device). That is, the authenticator application 310 may read the encryption key off of the NFC device. In such an example, the authenticator application 310 (on the client device) may decrypt the encrypted enrollment token using the received encryption key. In some other examples, decryption of the encrypted enrollment token may occur on the NFC device. For example, the authenticator application 310 may transmit (or otherwise provide) the encrypted enrollment token to the NFC device in response to the NFC device request (e.g., in response to the end-user 385 tapping or scanning the NFC device using the client device). The NFC device may then use the encryption key on the NFC device to decrypt the encrypted enrollment token. That is, the NFC device may execute a hardware operation to decrypt the encrypted enrollment token using the encryption key. The NFC device may then pass the decrypted enrollment token to the authenticator application 310. That is, the authenticator application 310 may receive the decrypted token from the NFC device. In some instances, performing the decryption on the NFC device (e.g., and not passing the encryption key to the client device) may be relatively more secure than performing the decryption on the client device.

At 370, the authentication service may enroll the end-user 385 in the authenticator application 310 on the client device with the decrypted token (e.g., based on decryption of the encrypted token using the encryption key on the NFC device). In some examples, after initial enrollment using the NFC device, the end-user 385 may enroll one or more other phishing resistant authenticators. As an illustrative example, the end-user 385 may enroll WebAuthN, which the end-user 385 may use for phishing resistance during authentication (e.g., for access to a resource). Additionally, or alternatively, the end-user 385 may use an ephemeral server, such as an ephemeral service illustrated by and described with reference to FIGS. 4 and 5, for phishing resistance during authentication.

Figure 4:
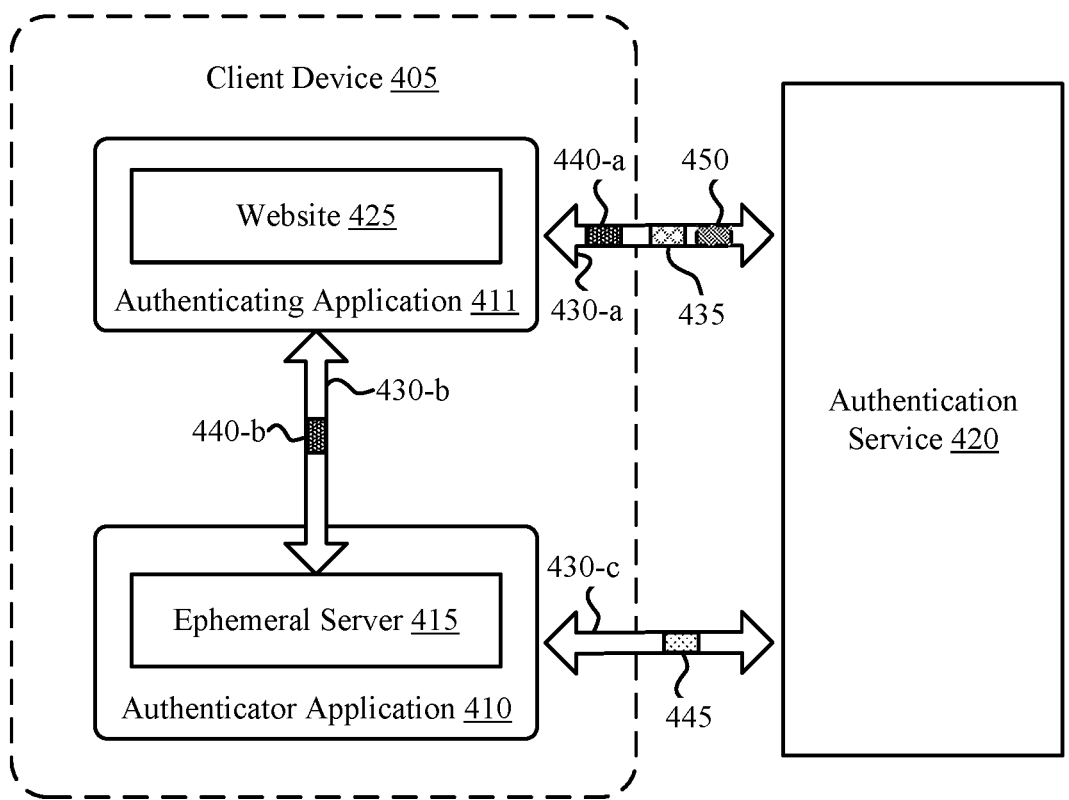
FIG. 4 shows an example of a computing system that supports techniques for phishing-resistant enrollment and on-device authentication in accordance with aspects of the present disclosure.
Figure 4:
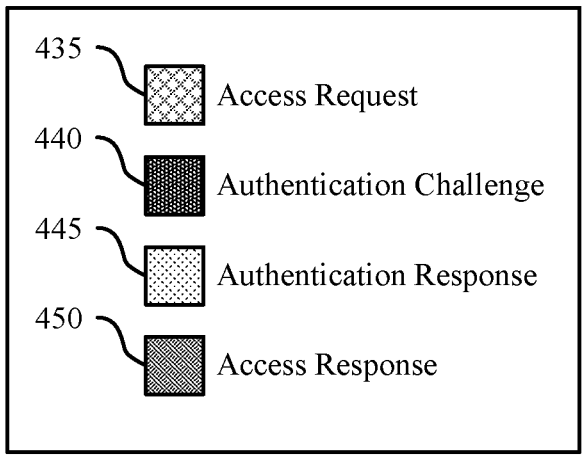

FIG. 4 shows an example of a computing system 400 that supports techniques for phishing-resistant enrollment and on-device authentication in accordance with aspects of the present disclosure. The computing system 400 includes a client devices 405, which may be an example of a client device illustrated by and described with reference to FIGS. 1 through 3. The computing system 400 may also include an authenticating application 411 and an authenticator application 410, which may be examples of applications illustrated by and described with reference to FIGS. 1 through 3. The computing system 400 may also include an authentication service 420, which may be an example of an authentication service illustrated by and described with reference to FIGS. 1 through 3. In some examples, the client device 405 may be operated by an end-user that is part of an organization (e.g., by an employee or client of a business, an enterprise, a non-profit, a startup, or any other organization type). In the example of FIG. 4, the organization may use the authentication service 420 (e.g., an IdP) to manage access to resources (e.g., applications) associated with the organization and to manage identifying information associated with the end-user, such that the end-user may access the resources via the authentication service 420.

For example, the end-user may enroll the authenticator application 410 on the client device 405 (e.g., using a hardware key or an NFC device illustrated by and described with reference to FIGS. 2 and 3). The end-user may then use the authenticator application 410 on the client device 405 to access the resources via the authentication service 420. That is, the authentication service 420 may authorize access to the resources based on authenticating the identity of the end-user using the authenticator application 410 enrolled on the client device 405. For example, the end-user may attempt to access the resource (e.g., an application, an intended website) via the authenticating application 411 (e.g., a browser). Accordingly, the authenticating application 411 may transmit an access request (on behalf of the end-user) to the authentication service 420 for access to the resource. In some examples, however, the authenticating application 411 may transmit the access request from a malicious website (e.g., an unintended website that is developed by an attacker and made to mimic the intended website). In other words, the end-user may request access to the resource from the malicious website on the authenticating application 411. For example, the attacker may use a phishing attack to cause the end-user to go to the malicious website via the authenticating application 411. In such an example, the access request transmitted via the authenticating application 411 may be from the malicious website. In accordance with an authentication protocol, the authentication service 420 may issue an authentication challenge to the end-user (e.g., via the authenticating application 411) in response to the access request. While on the malicious website, the end-user may use the authenticator application 410 to authenticate the authentication challenge (e.g., a legitimate authentication challenge) from the authentication service 420 for access to the resource. In such an example, the attacker may obtain access to the resource as well as other data that may be exchanged between the end-user and the resource. That is, the attacker may be inserted into a data path between the end-user and the resource (e.g., via a redirect going from the malicious website to the resource), such that data exchanged between the end-user and the resource may be relayed by the attacker. As such, the attacker may obtain sensitive data and compromise security for the organization (e.g., and the authentication service 420).

Some authenticating systems may support extensible SSO, which may be capable of intercepting traffic between the authenticating application 411 and the resource (e.g., to determine an origin for traffic going to the resource). However, extensible SSO may be constrained to managed devices and, as such, may not be suitable for unmanaged devices such as mobile devices. Additionally, or alternatively, some authenticating systems may support passkeys for phishing-resistant authentication. However, passkeys may experience one or more difficulties with lifecycle controls, configuration, and hardware key attributes. Additionally, or alternatively, passkeys may not be capable of performing a silent phishing-resistant check. For example, passkeys may be constrained to websites on which they are created and, as such, may not be capable of detecting whether a website is malicious. Some hardware keys may utilize phishing resistant protocols. However, the use of hardware keys may be relatively expensive for the organization and cumbersome for end-users. Additionally, in some cases, hardware keys may be incompatible with mobile devices.

In some other examples, the authentication service 420 (and the authenticator application 410) may support on-device authentication using an ephemeral server 415. For example, as illustrated in the example of FIG. 4, the end-user may open a website 425 via the authenticating application 411. Additionally, the end-user may attempt to access a resource protected by the authentication service 420 via the website 425. Accordingly, while on the website 425, the authenticating application 411 may transmit an access request 435 to the authentication service 420. The access request 435 may request access (by the end-user) to the protected resource. In response to receiving the access request 435, the authentication service 420 may issue an authentication challenge 440-a to the authenticating application 411 via a connection 430-a (e.g., a network connection). The authentication challenge 440-a may request that the authenticating application verify (e.g., prove) the identity of the end-user using an authenticator (e.g., a phishing-resistant authenticator, such as the authenticator application 410) for access to the resource in accordance with the access request 435. Accordingly, to satisfy the authentication challenge, the authenticating application 411 may use the authenticator application 410 to verify the identity of the end-user for access to the resource. For example, the authenticating application 411 may transmit an indication to the authenticator application 410 to activate (e.g., generate, start) an ephemeral server 415 for authenticating (e.g., validating) the identity of the end-user for access to the resource. That is, the authenticating application 411 may trigger (e.g., using an indication or some other mechanism) the authenticator application 410 to activate the ephemeral server 415 for authenticating the identity of the end-user. In some examples, the authenticating application 411 may trigger activation of the authenticator application 410 on the client device 405 (e.g., may trigger the authenticator application 410 to transition from an idle state to an active state) and, while operating in the active state (e.g., after starting up), the authenticator application 410 may generate (e.g., start) the ephemeral server 415.

In some examples, the website 425 may be a malicious website (e.g., a phishing website). In such examples, the authenticating application 411 (e.g., the browser) may relay traffic to the intended website (e.g., via code, such as JavaScript, on the malicious site). In such an example, on the malicious website, some code may be running in the authenticating application 411 that attempts to create a connection locally with the authenticator application 410 (e.g., using a network mechanism). For example, the authenticator application 410 may start up the ephemeral server 415 (e.g., a local server on the client device 405) and the authenticating application 411 may attempt to connect to the ephemeral server 415. In some examples, at part of the connection establishment, the authenticating application 411 may send a message (e.g., an HTTP header) to the ephemeral server 415 and the message may indicate the website 425 (e.g., may indicate which website the end-user is viewing, may indicate from which website the end-user is attempting to access the resource). In other words, the ephemeral server 415 may be started on the client device 405 (e.g., a mobile device) in the authenticator application 410 and the authenticating application 411 (e.g., the browser) may initiate the connection 430-*b*. In some examples, the authenticating application 411 may initiate the connection 430-*b* by polling the authentication service 420 (e.g., the backend of the identity management system) to determine whether authentication is valid or not. Additionally, during the polling process, the authenticating application 411 may attempt to connect to the ephemeral server 415 (which may be an instance of the authenticator application 410) on the client device 405, such that the authenticating application 411 may communicate directly with the authenticator application 410. In some examples, the ephemeral server 415 may be active (e.g., open, up) for a threshold duration (e.g., a few seconds).

As illustrated in the example of FIG. 4, the authenticating application 411 may establish the connection 430-*b* (e.g., a transport layer security (TLS) connection) with the ephemeral server 415 and may transmit (e.g., forward) an authentication challenge 440-*b* to the ephemeral server 415 via the connection 430-*b*. The authentication challenge 440-*b* may include (or be otherwise indicative of) the authentication challenge 440-*a*. The connection 430-*b* may enable the authenticating application 411 to communicate (e.g., directly) with the ephemeral server 415 from the website 425 (e.g., the website the end-user is viewing). In other words, the ephemeral server 415 may receive the authentication challenge 440-*b* directly from the authenticating application 411 on the website 425. That is, the authentication challenge 440-*b* received at the ephemeral server 415 via the established connection may originate from the website 425. Accordingly, the ephemeral server 415 may determine the origin of the authentication challenge 440-*b* (and thus the origin of the access request 435). For example, the ephemeral server 415 may read (e.g., determine) the website 425 that the authenticator application 410 is on (and that the end-user is viewing) from the authentication challenge 440-*b*. In some examples, a header of the authentication challenge 440-*b* may include information (e.g., metadata, domain information) about the authentication challenge 440-*b*, such as the origin of the authentication challenge 440-*b* or the access request 435, or both. As an illustrative example, the authentication challenge 440-*b* may be an HTTP POST request and the header of the HTTP POST request may include information that pertains to the origin (e.g., source) of the HTTP POST request (e.g., the website from which the HTTP POST request originated). In some examples, the header of the authentication challenge 440-*b* may include other information associated with the authenticating application 411, such as an application type, one or more capabilities of the authenticating application 411, or a version of the authenticating application 411 (e.g., the browser that generates the request), among other examples of information that may be included in the header.

The authenticator application 410 (e.g., the ephemeral server 415) may include an indication of the origin of the authentication challenge 440-*b* in a response to the authentication service 420. For example, the authenticator application 410 may transmit an authentication response 445 to the authentication service 420 via a connection 430-*c* (e.g., a network connection). The authentication response 445 may be responsive to the authentication challenge 440-*a* and may include information indicative of the origin of the access request 435 (which may be the same as the origin of the authentication challenge 440-*b*). In other words, the authenticator application 410 may send the authentication service 420 (e.g., the backend of the identity management system) a response that is indicative of the origin of the access request 435. For example, the authentication response 445 (e.g., a POST authentication challenge response, an HTTP POST response) may include metadata associated with the connection 430-*b* (e.g., secure channel metadata), such as information associated with (e.g., included in) the header of the authentication challenge 440-*b* (e.g., the HTTP POST request header).

The authentication service 420 may respond to the access request 435 in accordance with a determination of whether the indicated origin of the access request 435 is authorized for requesting access to the resource. In other words, authentication service 420 may respond to the access request 435 in accordance with the authentication response 445. For example, in response to receiving the authentication response 445 (which includes information indicative of the website 425 from which the access request 435 originated) the authentication service 420 may transmit an access response 450 to the authenticating application 411. The access response 450 may be based on whether the origin of the access request 435 (e.g., the website 425) is authorized for requesting access to the resource. For example, the authentication service 420 may determine whether the website 425 is authorized for requesting access to the resource (or authorized for authenticating the identity of the end-user). In some examples, the authentication service 420 may compare the origin of the authentication challenge 440-*b* (e.g., the HTTP POST request header) with a set of allowed websites (e.g., a list of sources (e.g., signers) authorized for authorized for requesting access to the resource) or a set of unallowed websites (a list of sources unauthorized for authorized for requesting access to the resource) to determine whether the origin (e.g., the website 425) is authorized for requesting access to the resource.

In some examples, such as examples in which the authentication service 420 compares the origin with the set of allowed websites, a website (all websites) that is not included in the set of allowed websites may be disallowed. That is, the authentication service 420 may determine that the website 425 (e.g., the origin of the authentication challenge 440-*b* and the access request 435) is not included in the allow list and, as such, may determine that the website 425 is not authorized for requesting access to the resource. In such an example, the access response 450 may include an error. Alternatively, the authentication service 420 may determine that the website 425 (e.g., the origin of the authentication challenge 440-*b* and the access request 435) is included in the allow list and, as such, may determine that the website 425 is authorized for requesting access to the resource (e.g., is a proper authentication server site). In such an example, the access response 450 may include an access token, which the authenticating application 411 may use to gain access to (e.g., get) the resource. In some examples, responding to the access request 435 based on the determination of whether the origin of the access request 435 is authorized for requesting access to the resource may lead to improved security for the organization, among other benefits.

Figure 5:
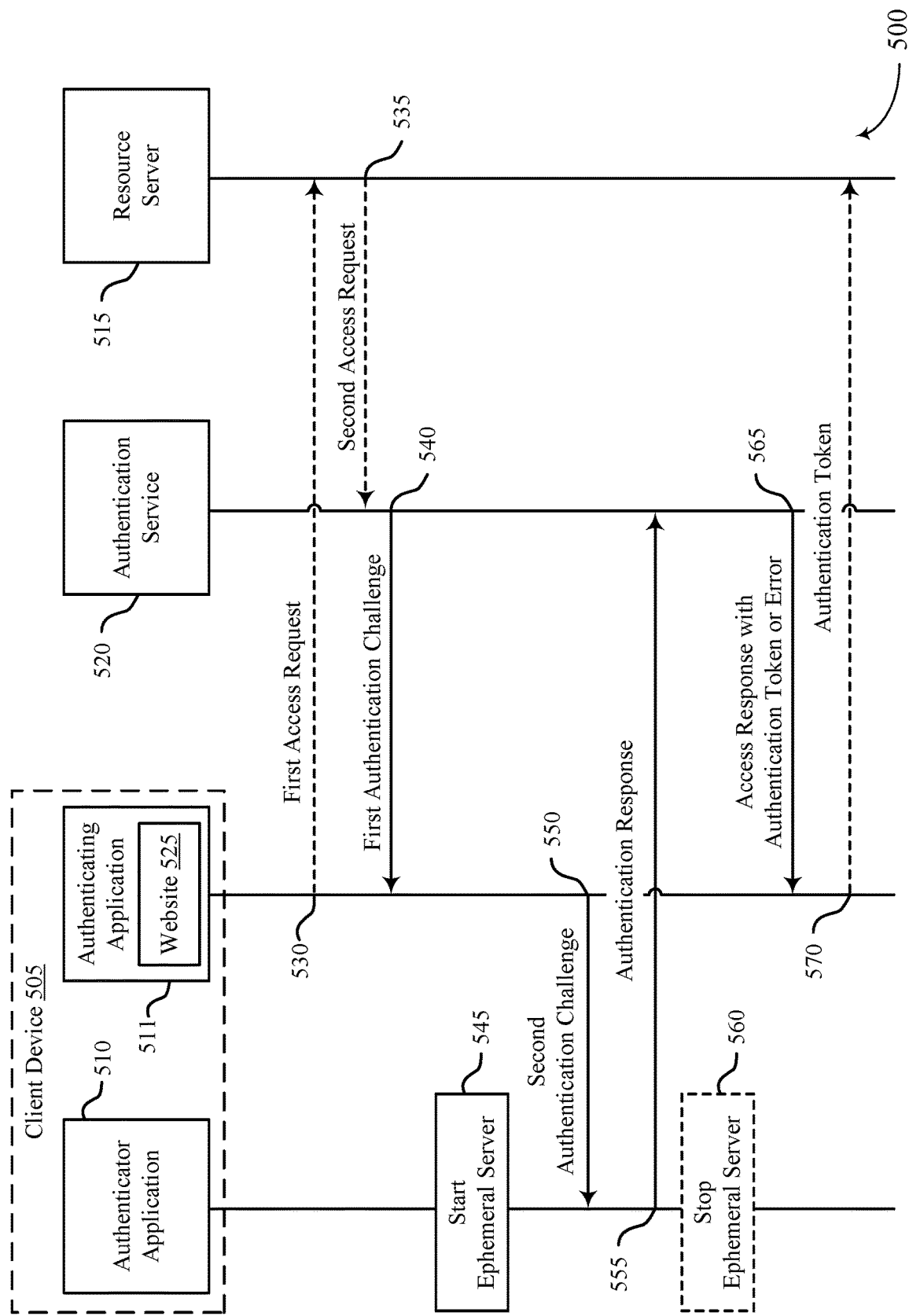
FIG. 5 shows an example of a process flow that supports techniques for phishing-resistant enrollment and on-device authentication in accordance with aspects of the present disclosure.

FIG. 5 shows an example of a process flow 500 that supports techniques for phishing-resistant enrollment and on-device authentication in accordance with aspects of the present disclosure. The process flow 500 may implement or be implemented by aspects of the computing system 100, the computing system 200, the process flow 300, and the computing system 400. For example, one or more aspects of the process flow 500 may be implemented at a server hosting an authentication service 520, which may be an example of an authentication service illustrated by and described with reference to FIGS. 1 through 4. Additionally, one or more aspects of the process flow 500 may be implemented at a resource server 515 (e.g., an application server, a serving storing one or more resources protected by the authentication service 520), which may be an example of a server illustrated by and described with reference to FIGS. 1 through 4. One or more aspects of the process flow 500 may also be implemented at a client device 505, which may be an example of a client device illustrated by and described with reference to FIGS. 1 through 4. For example, an authenticator application 510 and an authenticating application 511 (e.g., a browser) may operate on the client device 505. The authenticator application 510 and the authenticating application 511 may be examples of applications illustrated by and described with reference to FIGS. 1 through 4.

In the following description of the process flow 500, the information communicated between the client device 505 (e.g., the authenticator application 510 operating on the client device 505, the authenticating application 511 operating on the client device 505), the authentication service 520, and the resource server 515 may be performed in different orders or at different times than shown. Additionally, or alternatively, some operations may be omitted from the process flow 500 and other operations may be added to the process flow 500. In some examples, two or more operations may be combined in the process flow 500 (or an operation may be divided into multiple operations). The process flow 500 may provide for improved authentication, among other possible benefits. For example, as illustrated in the example of FIG. 5, the authenticator application 510, the authenticating application 511, the authentication service 520, and the resource server 515 may support phishing-resistant on-device authentication using an ephemeral server.

In some examples, the authentication service 520 may receive a first request for access to the resource server 515 (e.g., a resource stored at the resource server 515). The first request may be an example of an access request illustrated by and described with reference to FIGS. 2 through 4. For example, the first request may be for access to the resource server 515 by an end-user of the client device 505 using the authenticating application 511 on the client device 505. In some examples, the authentication service 520 may receive the first request from the authenticating application 511 via the resource server 515.

For example, at 530, the authenticating application 511 may transmit a first access request (e.g., a resource request) to the resource server 515 on behalf of the end-user. In some examples, the resource may be an example of a protected resource and access to the resource may be protected by (e.g., managed by, gated by) the authentication service 520. For example, the authentication service 520 may protect the resource using one or more phishing-resistant authenticators (e.g., may necessitate a phishing-resistant authenticator to grant access to the resource). In other words, the end-user may attempt to access a resource necessitating a phishing resistant authenticator using the authenticating application 511 (e.g., a browser or native application). Accordingly, the authenticating application 511 may transmit the first access request in response to the end-user of the client device 505 attempting to access the resource via the authenticating application 511. The authenticating application 511 may transmit the first access request from a website 525 which the end-user may be viewing. In other words, the website 525 may be the origin (e.g., source) of the first access request.

In some examples, at 535, the resource server 515 may transmit a second access request (e.g., an authentication token request) to the authentication service 520. For example, the resource server 515 may transmit the second access request to the authentication service 520 in response to the first access request. For example, in accordance with an authentication flow for the resource, the resource server 515 may request that the authentication service 520 issue a token for access to the resource based on the authentication of the identity of the end-user. In response to receiving the second access request (e.g., the authentication token request) from the resource server 515, the authentication service 520 may attempt to verify the identity of the end-user. In some examples, such as examples in which the resource is protected by a phishing-resistant authenticator, the authentication service 520 may determine one or more phishing resistant authenticators enrolled on the client device 505 (e.g., may determine which phishing-resistant authenticators are enrolled on the client device 505). In the example of FIG. 5, the authentication service 520 may determine that the authenticating application 511 corresponds to a phishing resistant authenticator enrolled on the client device 505. The end-user may have enrolled the authenticating application 511 on the client device 505 using one or more enrollment mechanisms, such enrollment mechanisms that may include use of a hardware device or an NFC device, such as an NFC device illustrated by or described with reference to FIGS. 2 and 3. Accordingly, the authentication service 520 may use the authenticating application 511 to verify the identity of the end-user.

At 540, the authentication service 520 may transmit a first authentication challenge to the authenticating application 511, for example, in response to the first access request. The first authentication challenge may be an example of an authentication challenge illustrated by and described with reference to FIG. 3. For example, the first authentication challenge may request that the identity of the end-user be verified using a phishing-resistant authenticator, such as the authenticator application 510. Accordingly, the authentication service 520 (or the authenticating application 511) may cause activation of the authenticator application 510 for validating the identity of the end-user. In other words, the authenticator application 510 may be activated on the client device 505 based on the authenticator application 510 being usable for validating the identity of the end-user.

In some examples, the authentication service 520 may use a link (e.g., an unverified link) to open the authenticator application 510. For example, the authenticator application 510 may be controlled by another application, which may not be active. Accordingly, the authentication service 520 may provide the end-user a link to the authenticator application 510 (e.g., may show the end-user a link to the valid on-device authenticator, such as a deep link, a universal link, or an application link). In such examples, the end-user may click (e.g., presses, select, tap) a button or create a push to activate the link, which may activate (e.g., start-up) the authenticator application 510. In some other examples, activation of the authenticator application 510 may be triggered by a silent PUSH notification. That is, generation of an ephemeral server of the authenticating application 511 may be triggered by a silent PUSH notification sent to the authenticator application 510. For example, the authentication service 520 may send a silent PUSH to one or more (e.g., all) PUSH-capable authenticators for the end-user. In some examples, using a silent PUSH notification to trigger the ephemeral server may include one or more permissions (e.g., additional permissions) for the end-user. Additionally, in some examples, using a silent PUSH notification to trigger the ephemeral server may provide for silent authentication flows (e.g., SSO extension). The authentication service 520 may use the link, the silent PUSH notification, or both a link and a silent PUSH notification. In other words, the authentication service 520 may transmit a message to activate the authenticator application 510 (e.g., in response to the first access request) and the message may include the link to the authenticator application 510 or the silent PUSH notification, or both.

In some other examples, the authenticating application 511 may trigger activation of the authenticator application 510. For example, in response to receiving the first authentication challenge at 540, the authenticating application 511 may determine to establish a connection with the authenticator application 510 (e.g., with an ephemeral server of the authenticator application 510), such that the authenticating application 511 may forward (or otherwise indicate) the first authentication challenge to the authenticator application 510. In other words, the authenticating application 511 may determine to use (and thus attempt to establish a connection with) the authenticator application 510 to resolve the first authentication challenge from the authentication service 520.

The authenticator application 510 may activate (e.g., wake-up) for a duration, which may be based on an execution time associated with the first authentication challenge. That is, the link or the silent PUSH from the authentication service 520 (or the indication from the authenticating application 511) may trigger the authenticator application 510 to wake for a duration over which the authenticator application 510 may execute (e.g., resolve, perform one or more operations associated with) the first authentication challenge. In other words, authenticator application 510 may wake-up for a threshold duration to resolve the first authentication challenge (e.g., a limited amount of execution time, such as 30 seconds).

At 545, the authenticator application 510 may start (e.g., generate, create) the ephemeral server. The ephemeral server may be an example of an ephemeral server illustrated by and described with reference to FIG. 3. For example, the authenticator application 510 may create the ephemeral server (e.g., a local HTTPS server) using a public domain and certificate (e.g., a public domain and certificate combination), which may be hosted by the authentication service 520 (e.g., the authentication service 520 server backend). In other words, the authenticator application 510 may generate the ephemeral server using a public domain and a certificate, in which the public domain and the certificate may be hosted by the authentication service 520. The authenticating application 511 (e.g., code inside the browser) may attempt to communicate (e.g., establish the connection with) with the ephemeral server on the client device 505. For example, the authenticating application 511 may attempt to communicate with the ephemeral server (e.g., local HTTPS server on the client device 505) by iterating through a list of known ports. In some examples, such as examples in which a listening port is found (e.g., detected), the authenticating application 511 may establish the connection (e.g., create a TLS connection) with the (local) ephemeral server.

At 550, the authenticator application 510 may receive a second authentication challenge from the authenticating application 511. For example, the authenticator application 510 may receive a message from the authenticating application 511 via the connection established between the authenticating application 511 and the ephemeral server and the message may include the second authentication challenge and a header that is indicative of an origin of the first access request. The second authentication challenge may include or be otherwise indicative of the first authentication challenge. For example, the authenticating application 511 may use the established connection to forward (or otherwise indicate) the first authentication challenge to the authenticator application 510 via the message, which may be an example of an HTTP message illustrated by and described with reference to FIG. 3. That is, the message may be an HTTP POST request and the header of the HTTP POST request may include information that pertains to the origin (e.g., source) of the HTTP POST request (e.g., the website 525 from which the HTTP POST request, and thus the first access request, originated). In other words, the authenticating application 511 may use the established connection to POST the second authentication challenge (e.g., a device challenge) to the ephemeral server of the local authenticator application (e.g., the authenticator application 510). The authenticator application 510 may then read the second authentication challenge (e.g., the device challenge), along with the HTTP header(s) of the second authentication challenge to determine the origin of the second authentication challenge and, accordingly, the origin of the first access request.

At 555, the authentication service 520 may receive an authentication response to the first authentication challenge from the authenticator application 510. The authentication response may be an example of an authentication response illustrated by and described with reference to FIG. 3. For example, the authentication response may include information indicative of the origin of the first access request. In other words, the authenticator application 510 may sign a response to the first authentication challenge (e.g., sent from the authentication service 520 at 540) with a device-bound key and may include, in the authentication response, the origin of the first access request as metadata. The origin of the first access request may correspond to the website 525, which the end-user may be viewing via the authenticating application 511.

The authentication service 520 may check the validity of the authentication response. For example, the authentication service 520, may verify that the device-bound key used to sign the authentication response is suitable (e.g., corresponds to a proper key). Additionally, the authentication service 520 may determine whether the origin of the first access request is authorized for requesting access to the resource. For example, the authentication service 520 may determine whether the origin value included in the authentication response matches (e.g., is included in) an allowlist of websites associated with (e.g., attached to) a configuration for the organization (e.g., tenant) of the end-user. In other words, the determination of whether the origin is authorized for requesting access to the resource may be based on a determination of whether the website 525 (e.g., the website determined by the authenticator application 510 as being the origin of the access request) is included in a set of websites authorized for requesting access to the resource. The set of websites may be based on the end-user, the organization of the end-user (e.g., the tenant of the multi-tenant system that is associated with the end-user), or both. For example, the organization may configure the authentication service 520 (e.g., a multi-tenant system) with a set of websites that the end-user may use to access one or more resources of the organization. Additionally, or alternatively, the organization may configure the authentication service 520 (e.g., a multi-tenant system) with a set of websites that multiple users (e.g., including the end-user) may use to access one or more resources of the organization. In other words, the set of websites may be configured per tenant or per end-user (e.g., based on a role or permissions associated with each end-user).

In some examples, at 560, the authenticator application 510 may stop (e.g., deactivate, destroy, discard) the ephemeral server. That is, the authenticator application 510 may create the ephemeral server at 545, use the ephemeral server for a threshold duration (e.g., to resolve the second authentication challenge received at 550), and then may discard the ephemeral server at 560. In some examples, the authenticator application 510 may transition from the active state to an inactive state after stopping the ephemeral server (e.g., to reduce a quantity of time during which the authenticator application 510 may be running in the background of the client device 505).

At 565, the authentication service 520 may transmit an access response based on the authentication response received at 555. In some examples, the access response may be responsive to the first access request and the second access request. For example, the authentication service 520 may include an authentication token (e.g., requested via the second access request) for access to the resource (e.g., request via the first access request) based on a determination of whether the origin is authorized for requesting access to the resource. In some examples, the authentication service 520 may determine that the website 525 (e.g., the origin of the first access request) is not included in the allow list and, as such, may determine that the website 525 is not authorized for requesting access to the resource. In such an example, the access response transmitted at 565 may include an error. Alternatively, the authentication service 520 may determine that the website 525 is included in the allow list and, as such, may determine that the website 525 is authorized for requesting access to the resource (e.g., is a proper authentication server site). In such an example, the access response transmitted at 565 may include the authentication token (e.g., an access token, a token usable for authenticating the identity of the end-user), which the authenticating application 511 may use to gain access to (e.g., get) the resource.

In some examples, at 570, the authenticating application 511 may transmit the authentication token to the resource server 515, such that the end-user may access the resource on the website 525. In some examples, using the ephemeral server to resolve the authentication challenge may provide a phishing-resistant authenticator flow for unmanaged devices (e.g., using HTTPS). Additionally, a quantity of time during which an application may be run in the background on a mobile device may be constrained. As such, running an always-on solution on the mobile device may be impractical due to resource constraints. Accordingly, using the ephemeral server, which may be active for a threshold quantity of time (e.g., a fixed quantity of time, a pre-configured quantity of time), to resolve authentication challenges may consume less resources and improve the performance of the client device 505 (e.g., a mobile device), among other benefits.

Figure 6:
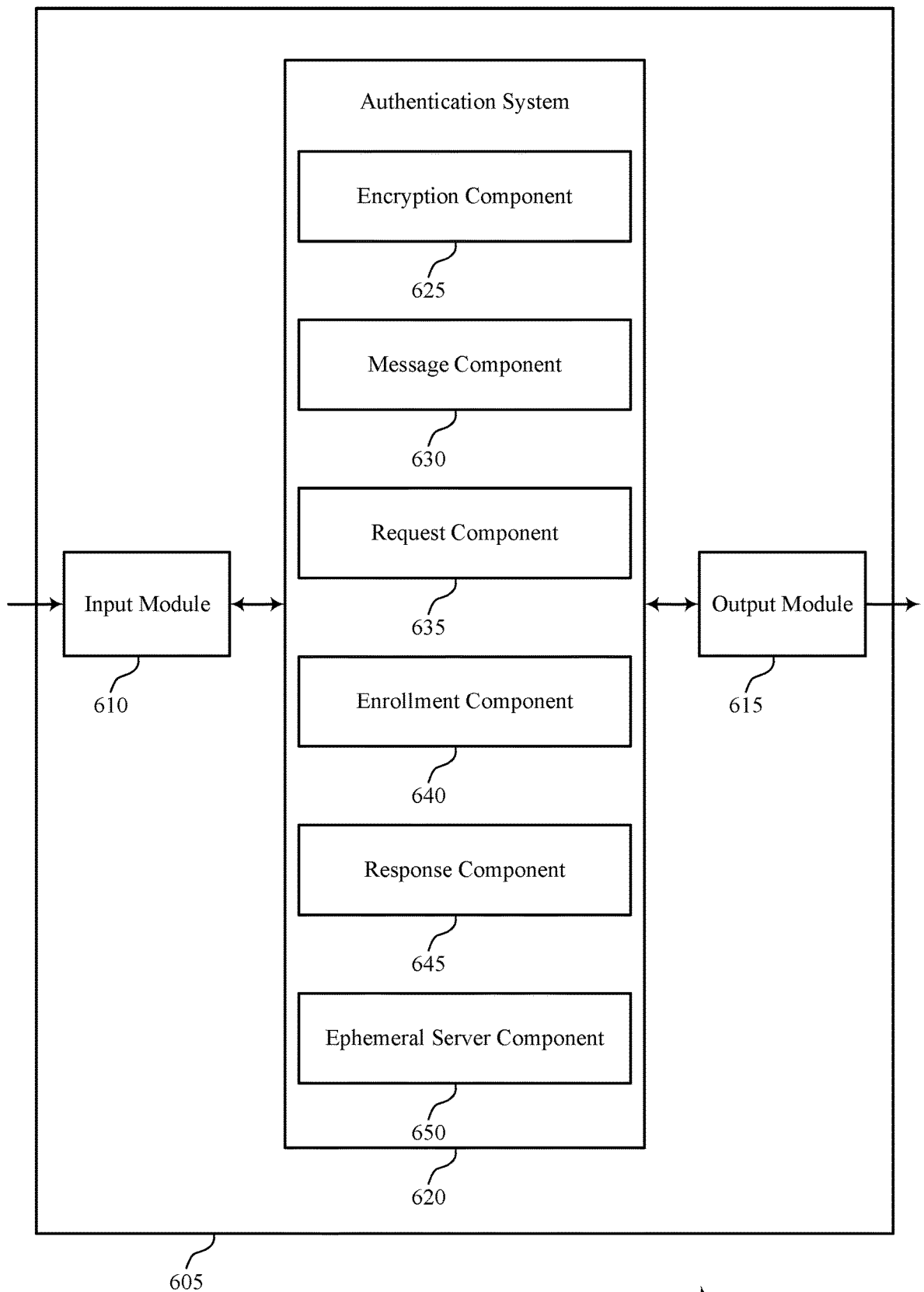
FIG. 6 shows a block diagram of an apparatus that supports techniques for phishing-resistant enrollment and on-device authentication in accordance with aspects of the present disclosure.

FIG. 6 shows a block diagram 600 of a device 605 that supports techniques for phishing-resistant enrollment and on-device authentication in accordance with aspects of the present disclosure. The device 605 may include an input module 610, an output module 615, and an authentication system 620. The device 605, or one or more components of the device 605 (e.g., the input module 610, the output module 615, and the authentication system 620), may include at least one processor, which may be coupled with at least one memory, to support the described techniques. Each of these components may be in communication with one another (e.g., via one or more buses). The authentication system 620 may be an example of, or include one or more components of, an identity management system as described herein.

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the authentication system 620 to support techniques for phishing-resistant enrollment and on-device authentication. In some cases, the input module 610 may be a component of an input/output (I/O) controller 810 as described with reference to FIG. 8.

The output module 615 may manage output signals for the device 605. For example, the output module 615 may receive signals from other components of the device 605, such as the authentication system 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the authentication system 620 may include an encryption component 625, a message component 630, a request component 635, an enrollment component 640, a response component 645, an ephemeral server component 650, or any combination thereof. In some examples, the authentication system 620, or various components thereof, may be configured to perform various operations (e.g., receiving, monitoring, transmitting) using or otherwise in cooperation with the input module 610, the output module 615, or both. For example, the authentication system 620 may receive information from the input module 610, send information to the output module 615, or be integrated in combination with the input module 610, the output module 615, or both to receive information, transmit information, or perform various other operations as described herein.

The authentication system 620 may support authenticator enrollment in a multi-tenant system in accordance with examples as disclosed herein. The encryption component 625 may be configured to support encrypting a token that is usable for an initial enrollment of a user in an authenticator application associated with the multi-tenant system, where the user is associated with a tenant of the multi-tenant system. The message component 630 may be configured to support transmitting a first message with a first payload to the user via an authentication service associated with the multi-tenant system, where the first payload includes at least the encrypted token. The request component 635 may be configured to support receiving, from the user via the authenticator application, a request to initiate the initial enrollment of the user on a device associated with the user, where the request includes the encrypted token. The enrollment component 640 may be configured to support enrolling the user in the authenticator application on the device based on decryption of the encrypted token using an encryption key on an NFC device that is associated with the user.

Additionally, or alternatively, the authentication system 620 may support user authentication in a multi-tenant system in accordance with examples as disclosed herein. The request component 635 may be configured to support receiving, via an authentication service of the multi-tenant system, a first request for access by a user to a resource using an authenticating application on a device. The response component 645 may be configured to support transmitting an authentication challenge to the authenticating application via the authentication service in response to the first request. The ephemeral server component 650 may be configured to support generating an ephemeral server via an authenticator application on the device, where the authenticator application is usable for validating an identity of the user associated with the first request. The message component 630 may be configured to support receiving a message from the authenticating application via a connection established between the authenticating application and the ephemeral server, where the message includes the authentication challenge and a header that is indicative of an origin of the first request. The request component 635 may be configured to support receiving, from the authenticator application, a response to the authentication challenge that includes information indicative of the origin of the first request. The response component 645 may be configured to support responding to the first request via the authentication service in accordance with a determination of whether the origin is authorized for requesting access to the resource.

Figure 7:
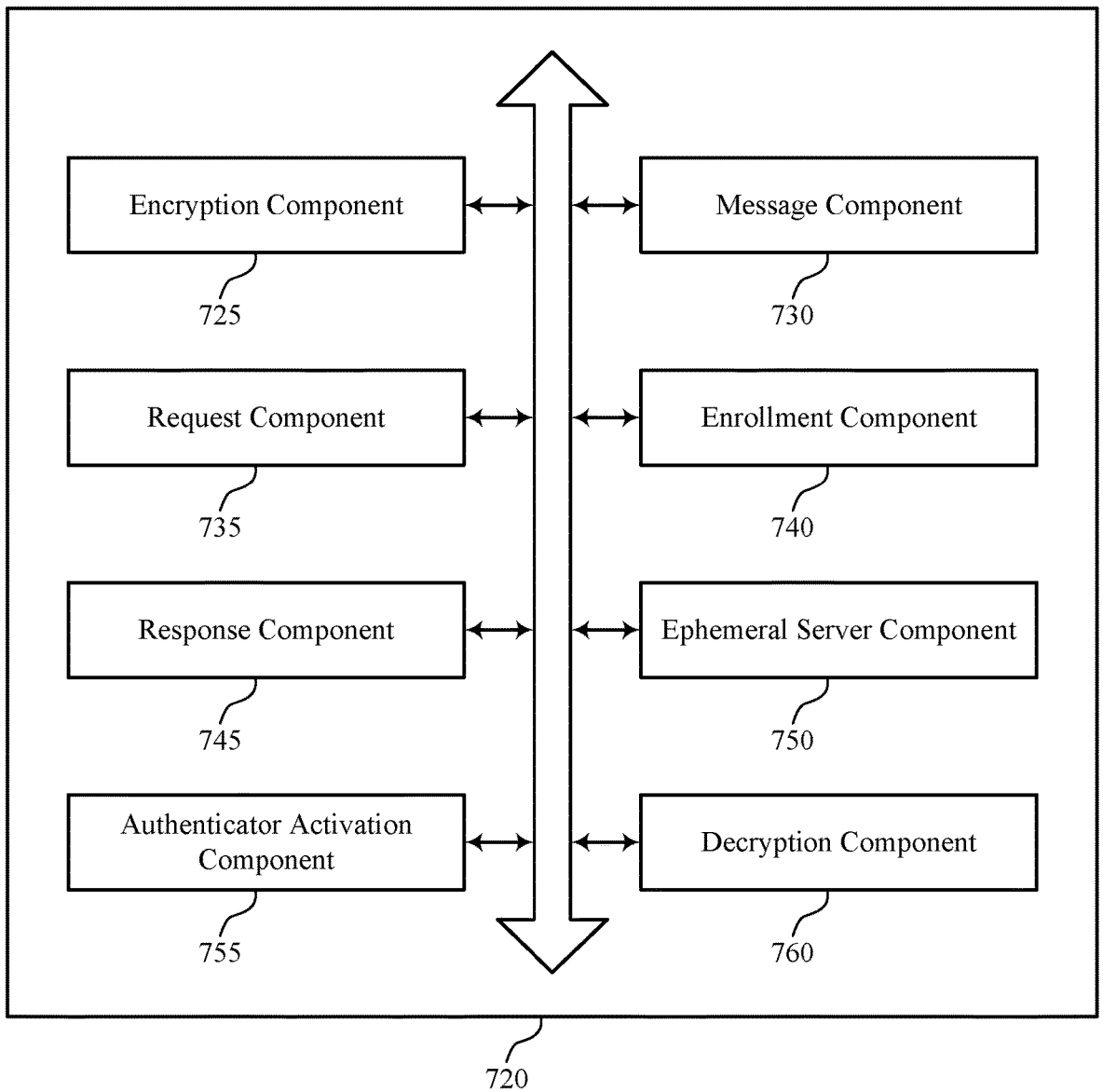
FIG. 7 shows a block diagram of an authentication system that supports techniques for phishing-resistant enrollment and on-device authentication in accordance with aspects of the present disclosure.

FIG. 7 shows a block diagram 700 of an authentication system 720 that supports techniques for phishing-resistant enrollment and on-device authentication in accordance with aspects of the present disclosure. The authentication system 720 may be an example of aspects of an authentication system or an authentication system 620, or both, as described herein. The authentication system 720, or various components thereof, may be an example of means for performing various aspects of techniques for phishing-resistant enrollment and on-device authentication as described herein. For example, the authentication system 720 may include an encryption component 725, a message component 730, a request component 735, an enrollment component 740, a response component 745, an ephemeral server component 750, an authenticator activation component 755, a decryption component 760, or any combination thereof. Each of these components, or components of subcomponents thereof (e.g., one or more processors, one or more memories), may communicate, directly or indirectly, with one another (e.g., via one or more buses).

The authentication system 720 may support authenticator enrollment in a multi-tenant system in accordance with examples as disclosed herein. The encryption component 725 may be configured to support encrypting a token that is usable for an initial enrollment of a user in an authenticator application associated with the multi-tenant system, where the user is associated with a tenant of the multi-tenant system. The message component 730 may be configured to support transmitting a first message with a first payload to the user via an authentication service associated with the multi-tenant system, where the first payload includes at least the encrypted token. The request component 735 may be configured to support receiving, from the user via the authenticator application, a request to initiate the initial enrollment of the user on a device associated with the user, where the request includes the encrypted token. The enrollment component 740 may be configured to support enrolling the user in the authenticator application on the device based on decryption of the encrypted token using an encryption key on an NFC device that is associated with the user.

In some examples, the request component 735 may be configured to support receiving, from an administrator of the tenant, a first request for the initial enrollment of the user in the authenticator application, where encrypting the token is in response to the first request. In some examples, the encryption component 725 may be configured to support generating one or more encryption keys via the authentication service in response to the first request, where the one or more encryption keys include at least the encryption key. In some examples, the NFC device includes a second payload that includes at least the encryption key.

In some examples, the second payload further includes an algorithm used to encrypt the token, an identifier of a key used to encrypt the token, data associated with the encryption key, a link to the authenticator application, or metadata usable for linking the encrypted token with the second payload, or any combination thereof. In some examples, the first payload further includes an indication of the tenant, an identifier of a key used to encrypt the token, or metadata associated with the decryption of the encrypted token, or any combination thereof.

In some examples, the request component 735 may be configured to support transmitting, to the user in response to the request, a second request for the user to verify possession of the NFC device, where decryption of the encrypted token using the encryption key on the NFC device is based on the user possessing the NFC device.

In some examples, to support enrolling the user in the authenticator application on the device, the encryption component 725 may be configured to support receiving the encryption key from the NFC device in response to the second request. In some examples, to support enrolling the user in the authenticator application on the device, the decryption component 760 may be configured to support decrypting the encrypted token via the authenticator application on the device using the encryption key. In some examples, to support enrolling the user in the authenticator application on the device, the enrollment component 740 may be configured to support enrolling the user in the authenticator application on the device using the decrypted token.

In some examples, to support enrolling the user in the authenticator application on the device, the encryption component 725 may be configured to support transmitting, via the authenticator application on the device, the encrypted token to the NFC device for decryption on the NFC device, where transmitting the encrypted token to the NFC device is based on the user successfully verifying possession of the NFC device. In some examples, to support enrolling the user in the authenticator application on the device, the decryption component 760 may be configured to support receiving the decrypted token from the NFC device. In some examples, to support enrolling the user in the authenticator application on the device, the enrollment component 740 may be configured to support enrolling the user in the authenticator application on the device using the decrypted token.

In some examples, to support transmitting the first message, the message component 730 may be configured to support transmitting the first message via electronic mail, a short messaging service, or a machine-readable code, or any combination thereof.

In some examples, to support encrypting the token, the encryption component 725 may be configured to support encrypting the token using a public key of an asymmetric keypair, where the encryption key includes a private key of the asymmetric keypair. In some examples, to support encrypting the token, the encryption component 725 may be configured to support encrypting the token using the encryption key, where the encryption key includes a symmetric key. In some examples, the token includes an enrollment-permissioned bearer or a one-time token.

Additionally, or alternatively, the authentication system 720 may support user authentication in a multi-tenant system in accordance with examples as disclosed herein. In some examples, the request component 735 may be configured to support receiving, via an authentication service of the multi-tenant system, a first request for access by a user to a resource using an authenticating application on a device. The response component 745 may be configured to support transmitting an authentication challenge to the authenticating application via the authentication service in response to the first request. The ephemeral server component 750 may be configured to support generating an ephemeral server via an authenticator application on the device, where the authenticator application is usable for validating an identity of the user associated with the first request. In some examples, the message component 730 may be configured to support receiving a message from the authenticating application via a connection established between the authenticating application and the ephemeral server, where the message includes the authentication challenge and a header that is indicative of an origin of the first request. In some examples, the request component 735 may be configured to support receiving, from the authenticator application, a response to the authentication challenge that includes information indicative of the origin of the first request. In some examples, the response component 745 may be configured to support responding to the first request via the authentication service in accordance with a determination of whether the origin is authorized for requesting access to the resource.

In some examples, the authenticator activation component 755 may be configured to support activating the authenticator application on the device based on the authenticator application being usable for validating the identity of the user associated with the first request, where generating the ephemeral server is based on activating the authenticator application.

In some examples, the message component 730 may be configured to support transmitting, via the authentication service, a first message to activate the authenticator application, where activating the authenticator application is in response to the first message, and where the first message includes a link to the authenticator application or a push notification. In some examples, to support activating the authenticator application on the device, the authenticator activation component 755 may be configured to support activating the authenticator application for a duration that is based on an execution time associated with the authentication challenge.

In some examples, to support generating the ephemeral server, the ephemeral server component 750 may be configured to support generating the ephemeral server using a public domain and a certificate, where the public domain and the certificate are hosted by the authentication service. In some examples, the origin corresponds to a website and the determination of whether the origin is authorized for requesting access to the resource includes a determination of whether the website is included in a set of websites authorized for requesting access to the resource. In some examples, the set of websites is based on the user, a tenant of the multi-tenant system that is associated with the user, or both.

Figure 8:
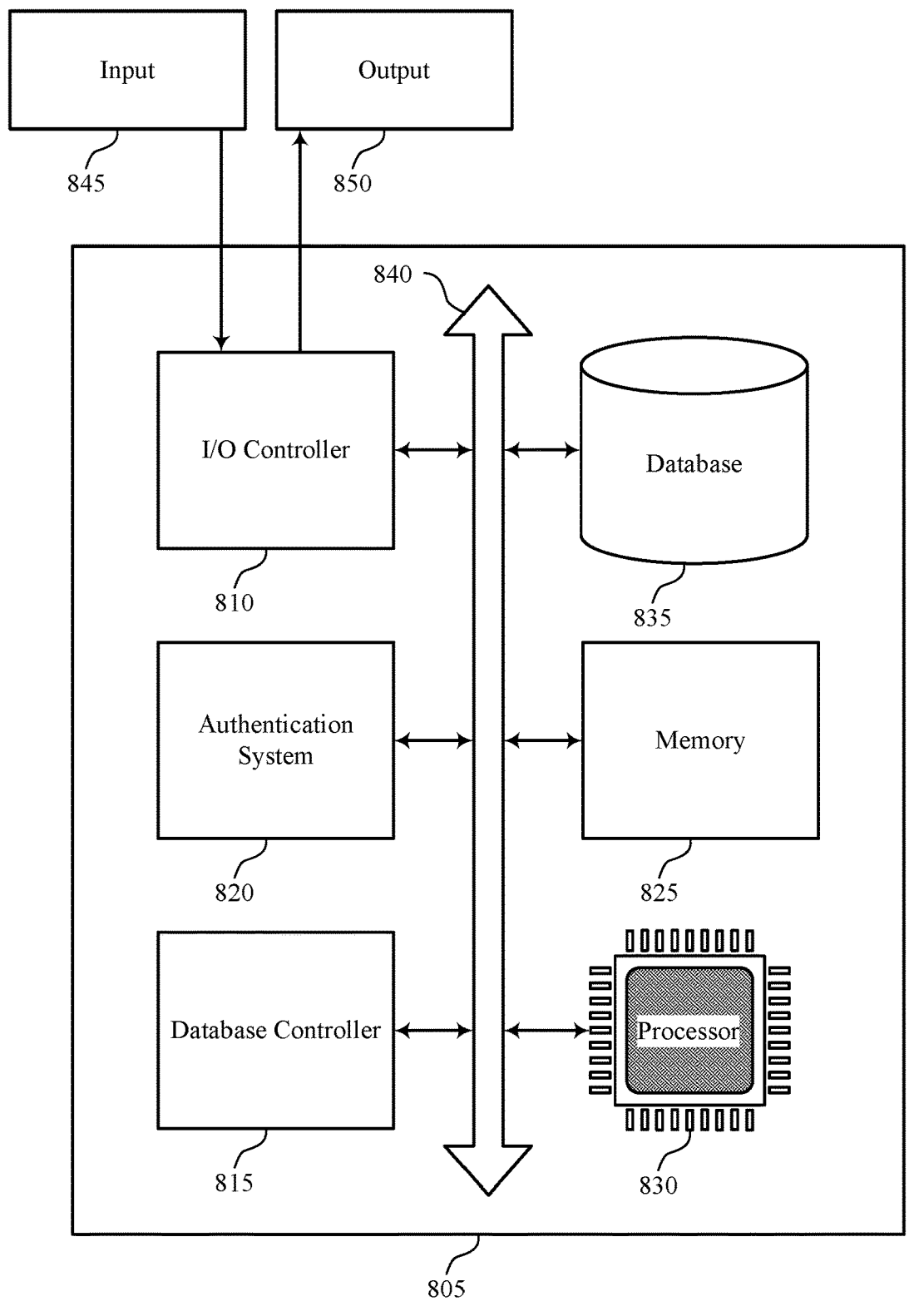
FIG. 8 shows a diagram of a system including a device that supports techniques for phishing-resistant enrollment and on-device authentication in accordance with aspects of the present disclosure.

FIG. 8 shows a diagram of a system 800 including a device 805 that supports techniques for phishing-resistant enrollment and on-device authentication in accordance with aspects of the present disclosure. The device 805 may be an example of or include the components of a device 605 as described herein. The device 805 may include components for bi-directional voice and data communications including components for transmitting and receiving communications, such as an authentication system 820, an I/O controller 810, a database controller 815, at least one memory 825, at least one processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause at least one processor 830 to perform various functions described herein. In some cases, the memory 825 may contain, among other things, a basic I/O system (BIOS) which may control basic hardware or software operation such as the interaction with peripheral components or devices. The memory 825 may be an example of a single memory or multiple memories. For example, the device 805 may include one or more memories 825.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in at least one memory 825 to perform various functions (e.g., functions or tasks supporting techniques for phishing-resistant enrollment and on-device authentication). The processor 830 may be an example of a single processor or multiple processors. For example, the device 805 may include one or more processors 830.

The authentication system 820 may support authenticator enrollment in a multi-tenant system in accordance with examples as disclosed herein. For example, the authentication system 820 may be configured to support encrypting a token that is usable for an initial enrollment of a user in an authenticator application associated with the multi-tenant system, where the user is associated with a tenant of the multi-tenant system. The authentication system 820 may be configured to support transmitting a first message with a first payload to the user via an authentication service associated with the multi-tenant system, where the first payload includes at least the encrypted token. The authentication system 820 may be configured to support receiving, from the user via the authenticator application, a request to initiate the initial enrollment of the user on a device associated with the user, where the request includes the encrypted token. The authentication system 820 may be configured to support enrolling the user in the authenticator application on the device based on decryption of the encrypted token using an encryption key on an NFC device that is associated with the user.

Additionally, or alternatively, the authentication system 820 may support user authentication in a multi-tenant system in accordance with examples as disclosed herein. For example, the authentication system 820 may be configured to support receiving, via an authentication service of the multi-tenant system, a first request for access by a user to a resource using an authenticating application on a device. The authentication system 820 may be configured to support transmitting an authentication challenge to the authenticating application via the authentication service in response to the first request. The authentication system 820 may be configured to support generating an ephemeral server via an authenticator application on the device, where the authenticator application is usable for validating an identity of the user associated with the first request. The authentication system 820 may be configured to support receiving a message from the authenticating application via a connection established between the authenticating application and the ephemeral server, where the message includes the authentication challenge and a header that is indicative of an origin of the first request. The authentication system 820 may be configured to support receiving, from the authenticator application, a response to the authentication challenge that includes information indicative of the origin of the first request. The authentication system 820 may be configured to support responding to the first request via the authentication service in accordance with a determination of whether the origin is authorized for requesting access to the resource.

By including or configuring the authentication system 820 in accordance with examples as described herein, the device 805 may support techniques for improved communication reliability, reduced latency, and improved user experience related to reduced processing.

Figure 9:
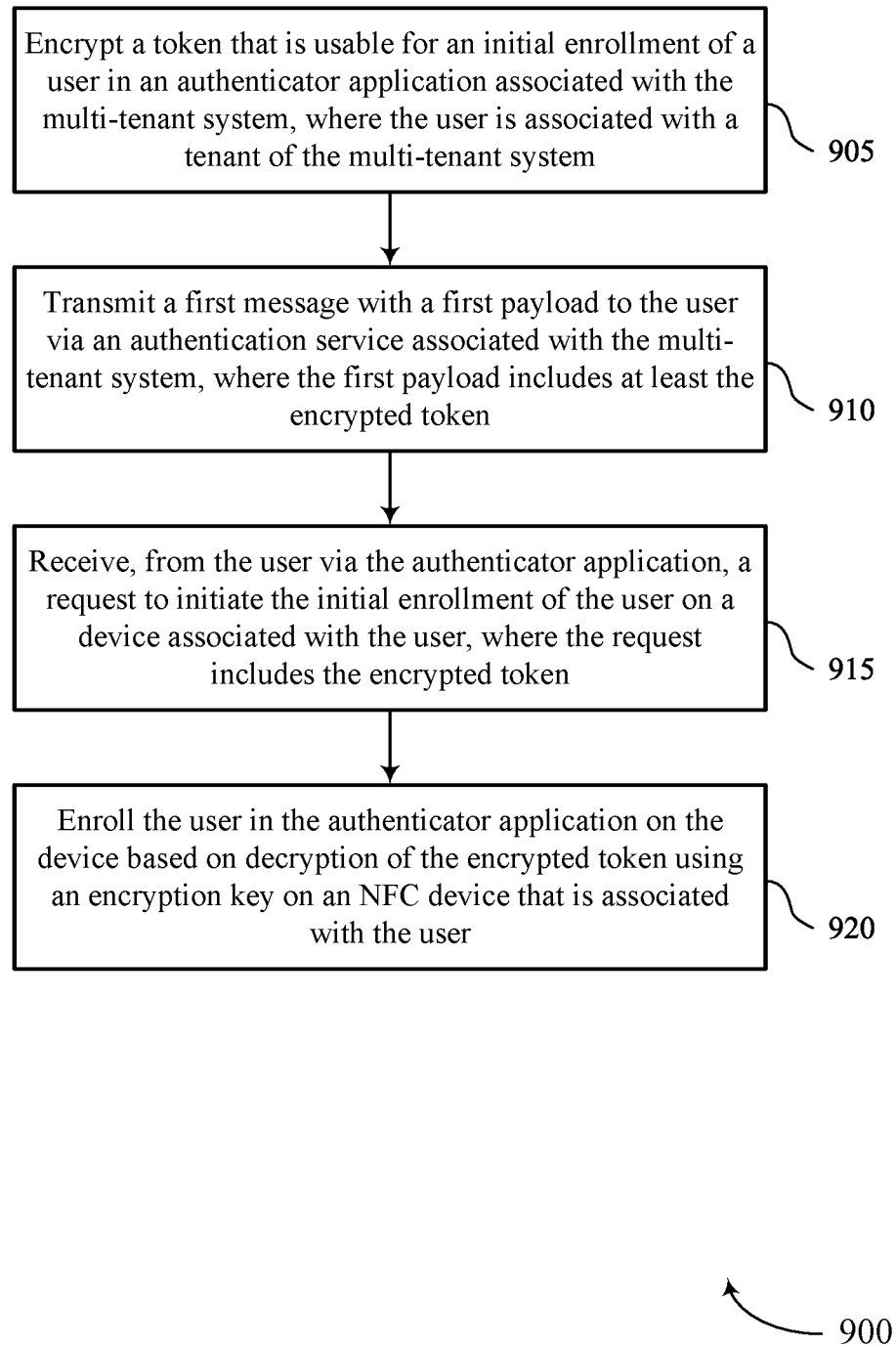
FIGS. 9 and 10 show flowcharts illustrating methods that support techniques for phishing-resistant enrollment and on-device authentication in accordance with aspects of the present disclosure.

FIG. 9 shows a flowchart illustrating a method 900 that supports techniques for phishing-resistant enrollment and on-device authentication in accordance with aspects of the present disclosure. The operations of the method 900 may be implemented by an Okta Device or its components as described herein. For example, the operations of the method 900 may be performed by an Okta Device as described with reference to FIGS. 1 through 8. In some examples, an Okta Device may execute a set of instructions to control the functional elements of the Okta Device to perform the described functions. Additionally, or alternatively, the Okta Device may perform aspects of the described functions using special-purpose hardware.

At 905, the method may include encrypting a token that is usable for an initial enrollment of a user in an authenticator application associated with the multi-tenant system, where the user is associated with a tenant of the multi-tenant system. The operations of block 905 may be performed in accordance with examples as disclosed herein. In some examples, aspects of the operations of 905 may be performed by an encryption component 725 as described with reference to FIG. 7.

At 910, the method may include transmitting a first message with a first payload to the user via an authentication service associated with the multi-tenant system, where the first payload includes at least the encrypted token. The operations of block 910 may be performed in accordance with examples as disclosed herein. In some examples, aspects of the operations of 910 may be performed by a message component 730 as described with reference to FIG. 7.

At 915, the method may include receiving, from the user via the authenticator application, a request to initiate the initial enrollment of the user on a device associated with the user, where the request includes the encrypted token. The operations of block 915 may be performed in accordance with examples as disclosed herein. In some examples, aspects of the operations of 915 may be performed by a request component 735 as described with reference to FIG. 7.

At 920, the method may include enrolling the user in the authenticator application on the device based on decryption of the encrypted token using an encryption key on an NFC device that is associated with the user. The operations of block 920 may be performed in accordance with examples as disclosed herein. In some examples, aspects of the operations of 920 may be performed by an enrollment component 740 as described with reference to FIG. 7.

Figure 10:
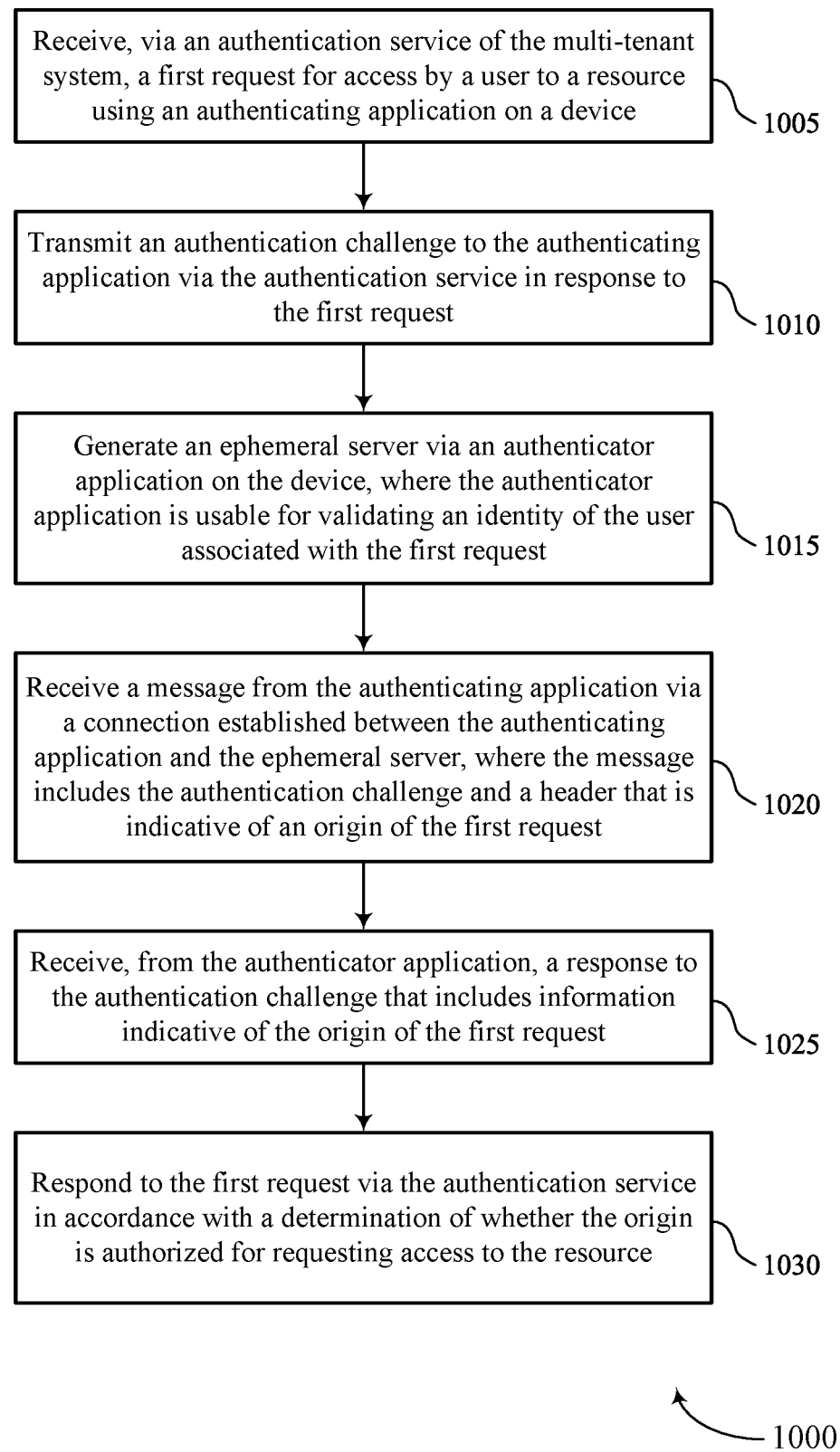

FIG. 10 shows a flowchart illustrating a method 1000 that supports techniques for phishing-resistant enrollment and on-device authentication in accordance with aspects of the present disclosure. The operations of the method 1000 may be implemented by an Okta Device or its components as described herein. For example, the operations of the method 1000 may be performed by an Okta Device as described with reference to FIGS. 1 through 8. In some examples, an Okta Device may execute a set of instructions to control the functional elements of the Okta Device to perform the described functions. Additionally, or alternatively, the Okta Device may perform aspects of the described functions using special-purpose hardware.

At 1005, the method may include receiving, via an authentication service of the multi-tenant system, a first request for access by a user to a resource using an authenticating application on a device. The operations of block 1005 may be performed in accordance with examples as disclosed herein. In some examples, aspects of the operations of 1005 may be performed by a request component 735 as described with reference to FIG. 7.

At 1010, the method may include transmitting an authentication challenge to the authenticating application via the authentication service in response to the first request. The operations of block 1010 may be performed in accordance with examples as disclosed herein. In some examples, aspects of the operations of 1010 may be performed by a response component 745 as described with reference to FIG. 7.

At 1015, the method may include generating an ephemeral server via an authenticator application on the device, where the authenticator application is usable for validating an identity of the user associated with the first request. The operations of block 1015 may be performed in accordance with examples as disclosed herein. In some examples, aspects of the operations of 1015 may be performed by an ephemeral server component 750 as described with reference to FIG. 7.

At 1020, the method may include receiving a message from the authenticating application via a connection established between the authenticating application and the ephemeral server, where the message includes the authentication challenge and a header that is indicative of an origin of the first request. The operations of block 1020 may be performed in accordance with examples as disclosed herein. In some examples, aspects of the operations of 1020 may be performed by a message component 730 as described with reference to FIG. 7.

At 1025, the method may include receiving, from the authenticator application, a response to the authentication challenge that includes information indicative of the origin of the first request. The operations of block 1025 may be performed in accordance with examples as disclosed herein. In some examples, aspects of the operations of 1025 may be performed by a request component 735 as described with reference to FIG. 7.

At 1030, the method may include responding to the first request via the authentication service in accordance with a determination of whether the origin is authorized for requesting access to the resource. The operations of block 1030 may be performed in accordance with examples as disclosed herein. In some examples, aspects of the operations of 1030 may be performed by a response component 745 as described with reference to FIG. 7.

The following provides an overview of aspects of the present disclosure:

Aspect 1: A computer-implemented method for authenticator enrollment in a multi-tenant system, comprising: encrypting a token that is usable for an initial enrollment of a user in an authenticator application associated with the multi-tenant system, wherein the user is associated with a tenant of the multi-tenant system; transmitting a first message with a first payload to the user via an authentication service associated with the multi-tenant system, wherein the first payload includes at least the encrypted token; receiving, from the user via the authenticator application, a request to initiate the initial enrollment of the user on a device associated with the user, wherein the request includes the encrypted token; and enrolling the user in the authenticator application on the device based at least in part on decryption of the encrypted token using an encryption key on an NFC device that is associated with the user.

Aspect 2: The computer-implemented method of aspect 1, further comprising: receiving, from an administrator of the tenant, a first request for the initial enrollment of the user in the authenticator application, wherein encrypting the token is in response to the first request.

Aspect 3: The computer-implemented method of aspect 2, further comprising: generating one or more encryption keys via the authentication service in response to the first request, wherein the one or more encryption keys include at least the encryption key.

Aspect 4: The computer-implemented method of any of aspects 2 through 3, wherein the NFC device comprises a second payload that includes at least the encryption key.

Aspect 5: The computer-implemented method of aspect 4, wherein the second payload further comprises an algorithm used to encrypt the token, an identifier of a key used to encrypt the token, data associated with the encryption key, a link to the authenticator application, or metadata usable for linking the encrypted token with the second payload, or any combination thereof.

Aspect 6: The computer-implemented method of any of aspects 1 through 5, wherein the first payload further comprises an indication of the tenant, an identifier of a key used to encrypt the token, or metadata associated with the decryption of the encrypted token, or any combination thereof.

Aspect 7: The computer-implemented method of any of aspects 1 through 6, further comprising: transmitting, to the user in response to the request, a second request for the user to verify possession of the NFC device, wherein decryption of the encrypted token using the encryption key on the NFC device is based at least in part on the user possessing the NFC device.

Aspect 8: The computer-implemented method of aspect 7, wherein enrolling the user in the authenticator application on the device comprises: receiving the encryption key from the NFC device in response to the second request; decrypting the encrypted token via the authenticator application on the device using the encryption key; and enrolling the user in the authenticator application on the device using the decrypted token.

Aspect 9: The computer-implemented method of aspect 7, wherein enrolling the user in the authenticator application on the device comprises: transmitting, via the authenticator application on the device, the encrypted token to the NFC device for decryption on the NFC device, wherein transmitting the encrypted token to the NFC device is based at least in part on the user successfully verifying possession of the NFC device; receiving the decrypted token from the NFC device; and enrolling the user in the authenticator application on the device using the decrypted token.

Aspect 10: The computer-implemented method of any of aspects 1 through 9, wherein transmitting the first message comprises: transmitting the first message via electronic mail, a short messaging service, or a machine-readable code, or any combination thereof.

Aspect 11: The computer-implemented method of any of aspects 1 through 10, wherein encrypting the token comprises: encrypting the token using a public key of an asymmetric keypair, wherein the encryption key comprises a private key of the asymmetric keypair.

Aspect 12: The computer-implemented method of any of aspects 1 through 10, wherein encrypting the token comprises: encrypting the token using the encryption key, wherein the encryption key comprises a symmetric key.

Aspect 13: The computer-implemented method of any of aspects 1 through 12, wherein the token comprises an enrollment-permissioned bearer or a one-time token.

Aspect 14: A computer-implemented method for user authentication in a multi-tenant system, comprising: receiving, via an authentication service of the multi-tenant system, a first request for access by a user to a resource using an authenticating application on a device; transmitting an authentication challenge to the authenticating application via the authentication service in response to the first request; generating an ephemeral server via an authenticator application on the device, wherein the authenticator application is usable for validating an identity of the user associated with the first request; receiving a message from the authenticating application via a connection established between the authenticating application and the ephemeral server, wherein the message comprises the authentication challenge and a header that is indicative of an origin of the first request; receiving, from the authenticator application, a response to the authentication challenge that includes information indicative of the origin of the first request; and responding to the first request via the authentication service in accordance with a determination of whether the origin is authorized for requesting access to the resource.

Aspect 15: The computer-implemented method of aspect 14, further comprising: activating the authenticator application on the device based at least in part on the authenticator application being usable for validating the identity of the user associated with the first request, wherein generating the ephemeral server is based at least in part on activating the authenticator application.

Aspect 16: The computer-implemented method of aspect 15, further comprising: transmitting, via the authentication service, a first message to activate the authenticator application, wherein activating the authenticator application is in response to the first message, and wherein the first message comprises a link to the authenticator application or a push notification.

Aspect 17: The computer-implemented method of any of aspects 15 through 16, wherein activating the authenticator application on the device comprises: activating the authenticator application for a duration that is based at least in part on an execution time associated with the authentication challenge.

Aspect 18: The computer-implemented method of any of aspects 14 through 17, wherein generating the ephemeral server comprises: generating the ephemeral server using a public domain and a certificate, wherein the public domain and the certificate are hosted by the authentication service.

Aspect 19: The computer-implemented method of any of aspects 14 through 18, wherein the origin corresponds to a website and the determination of whether the origin is authorized for requesting access to the resource comprises a determination of whether the website is included in a set of websites authorized for requesting access to the resource.

Aspect 20: The computer-implemented method of aspect 19, wherein the set of websites is based at least in part on the user, a tenant of the multi-tenant system that is associated with the user, or both.

Aspect 21: An apparatus for authenticator enrollment in a multi-tenant system, comprising one or more memories storing processor-executable code, and one or more processors coupled with the one or more memories and individually or collectively operable to execute the code to cause the apparatus to perform a method of any of aspects 1 through 13.

Aspect 22: An apparatus for authenticator enrollment in a multi-tenant system, comprising at least one means for performing a method of any of aspects 1 through 13.

Aspect 23: A non-transitory computer-readable medium storing code for authenticator enrollment in a multi-tenant system, the code comprising instructions executable by one or more processors to perform a method of any of aspects 1 through 13.

Aspect 24: An apparatus for user authentication in a multi-tenant system, comprising one or more memories storing processor-executable code, and one or more processors coupled with the one or more memories and individually or collectively operable to execute the code to cause the apparatus to perform a method of any of aspects 14 through 20.

Aspect 25: An apparatus for user authentication in a multi-tenant system, comprising at least one means for performing a method of any of aspects 14 through 20.

Aspect 26: A non-transitory computer-readable medium storing code for user authentication in a multi-tenant system, the code comprising instructions executable by one or more processors to perform a method of any of aspects 14 through 20.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method for authenticator enrollment in a multi-tenant system, comprising:
    encrypting a token that is usable for an initial enrollment of a user in an authenticator application associated with the multi-tenant system, wherein the user is associated with a tenant of the multi-tenant system;
    transmitting a first message with a first payload to the user via an authentication service associated with the multi-tenant system, wherein the first payload includes at least the encrypted token;
    receiving, from the user via the authenticator application, a request to initiate the initial enrollment of the user on a device associated with the user, wherein the request includes the encrypted token; and
    enrolling the user in the authenticator application on the device based at least in part on decryption of the encrypted token using an encryption key on a near-field communication (NFC) device that is associated with the user.

2. The computer-implemented method of claim 1, further comprising:
    receiving, from an administrator of the tenant, a first request for the initial enrollment of the user in the authenticator application, wherein encrypting the token is in response to the first request.

3. The computer-implemented method of claim 2, further comprising:
    generating one or more encryption keys via the authentication service in response to the first request, wherein the one or more encryption keys include at least the encryption key.

4. The computer-implemented method of claim 2, wherein the NFC device comprises a second payload that includes at least the encryption key.

5. The computer-implemented method of claim 4, wherein the second payload further comprises an algorithm used to encrypt the token, an identifier of a key used to encrypt the token, data associated with the encryption key, a link to the authenticator application, or metadata usable for linking the encrypted token with the second payload, or any combination thereof.

6. The computer-implemented method of claim 1, wherein the first payload further comprises an indication of the tenant, an identifier of a key used to encrypt the token, or metadata associated with the decryption of the encrypted token, or any combination thereof.

7. The computer-implemented method of claim 1, further comprising:
   transmitting, to the user in response to the request, a second request for the user to verify possession of the NFC device, wherein decryption of the encrypted token using the encryption key on the NFC device is based at least in part on the user possessing the NFC device.

8. The computer-implemented method of claim 7, wherein enrolling the user in the authenticator application on the device comprises:
   receiving the encryption key from the NFC device in response to the second request;
   decrypting the encrypted token via the authenticator application on the device using the encryption key; and
   enrolling the user in the authenticator application on the device using the decrypted token.

9. The computer-implemented method of claim 7, wherein enrolling the user in the authenticator application on the device comprises:
   transmitting, via the authenticator application on the device, the encrypted token to the NFC device for decryption on the NFC device, wherein transmitting the encrypted token to the NFC device is based at least in part on the user successfully verifying possession of the NFC device;
   receiving the decrypted token from the NFC device; and
   enrolling the user in the authenticator application on the device using the decrypted token.

10. The computer-implemented method of claim 1, wherein transmitting the first message comprises:
    transmitting the first message via electronic mail, a short messaging service, or a machine-readable code, or any combination thereof.

11. The computer-implemented method of claim 1, wherein encrypting the token comprises:
    encrypting the token using a public key of an asymmetric keypair, wherein the encryption key comprises a private key of the asymmetric keypair.

12. The computer-implemented method of claim 1, wherein encrypting the token comprises:
    encrypting the token using the encryption key, wherein the encryption key comprises a symmetric key.

13. The computer-implemented method of claim 1, wherein the token comprises an enrollment-permissioned bearer or a one-time token.

14. A computer-implemented method for user authentication in a multi-tenant system, comprising:
    receiving, via an authentication service of the multi-tenant system, a first request for access by a user to a resource using an authenticating application on a device;
    transmitting an authentication challenge to the authenticating application via the authentication service in response to the first request;
    generating an ephemeral server via an authenticator application on the device, wherein the authenticator application is usable for validating an identity of the user associated with the first request;
    receiving a message from the authenticating application via a connection established between the authenticating application and the ephemeral server, wherein the message comprises the authentication challenge and a header that is indicative of an origin of the first request;
    receiving, from the authenticator application, a response to the authentication challenge that includes information indicative of the origin of the first request; and
    responding to the first request via the authentication service in accordance with a determination of whether the origin is authorized for requesting access to the resource.

15. The computer-implemented method of claim 14, further comprising:
    activating the authenticator application on the device based at least in part on the authenticator application being usable for validating the identity of the user associated with the first request, wherein generating the ephemeral server is based at least in part on activating the authenticator application.

16. The computer-implemented method of claim 15, further comprising:
    transmitting, via the authentication service, a first message to activate the authenticator application, wherein activating the authenticator application is in response to the first message, and wherein the first message comprises a link to the authenticator application or a push notification.

17. The computer-implemented method of claim 15, wherein activating the authenticator application on the device comprises:
    activating the authenticator application for a duration that is based at least in part on an execution time associated with the authentication challenge.

18. The computer-implemented method of claim 14, wherein generating the ephemeral server comprises:
    generating the ephemeral server using a public domain and a certificate, wherein the public domain and the certificate are hosted by the authentication service.

19. The computer-implemented method of claim 14, wherein the origin corresponds to a website and the determination of whether the origin is authorized for requesting access to the resource comprises a determination of whether the website is included in a set of websites authorized for requesting access to the resource.

20. The computer-implemented method of claim 19, wherein the set of websites is based at least in part on the user, a tenant of the multi-tenant system that is associated with the user, or both.

* * * * *